US009958680B2

(12) United States Patent
Liu et al.

(10) Patent No.: US 9,958,680 B2
(45) Date of Patent: May 1, 2018

(54) NEAR-EYE DISPLAY DEVICE AND METHODS WITH COAXIAL EYE IMAGING

(71) Applicant: OmniVision Technologies, Inc., Santa Clara, CA (US)

(72) Inventors: Yi-Wei Liu, New Taipei (TW); Jau-Jan Deng, Taipei (TW); Regis Fan, Saint Paul, MN (US)

(73) Assignee: OmniVision Technologies, Inc., Santa Clara, CA (US)

( * ) Notice: Subject to any disclaimer, the term of this patent is extended or adjusted under 35 U.S.C. 154(b) by 190 days.

(21) Appl. No.: 14/869,067

(22) Filed: Sep. 29, 2015

(65) Prior Publication Data

US 2016/0091722 A1    Mar. 31, 2016

Related U.S. Application Data

(63) Continuation-in-part of application No. 14/794,725, filed on Jul. 8, 2015.

(30) Foreign Application Priority Data

Sep. 30, 2014   (CN) .......................... 2014 1 0522328

(51) Int. Cl.
*G09G 5/00* (2006.01)
*G02B 27/01* (2006.01)
(Continued)

(52) U.S. Cl.
CPC .......... *G02B 27/0172* (2013.01); *G02B 5/12* (2013.01); *G02B 5/3083* (2013.01);
(Continued)

(58) Field of Classification Search
CPC ..... G06F 3/011–3/013; G02B 26/08–26/0891; H04N 9/31–9/3197; H04N 5/7458; H04N 13/0427
(Continued)

(56) References Cited

U.S. PATENT DOCUMENTS 8,786,686 B1 * 7/2014 Amirparviz .......... H04N 13/044
345/8
8,867,131 B1 * 10/2014 Amirparviz .............. G02B 5/04
359/485.03

(Continued)

OTHER PUBLICATIONS

Hua, H. et al. Video-based eyetracking methods and algorithms in head-mounted displays, Optics Express, vol. 14, No. 10, May 15, 2006, pp. 4328-4350.
(Continued)

*Primary Examiner* — Roberto Flores
(74) *Attorney, Agent, or Firm* — Lathrop Gage LLP

(57) ABSTRACT

A near-eye display device, with coaxial eye imaging, for mounting in field of view of an eye of a user, includes a display unit for displaying a display image, a viewing unit for (i) presenting the display image to the eye based upon polarized visible light received from the display unit and (ii) transmitting ambient light from an ambient scene toward the eye, and an eye imaging unit including (a) an illumination module for generating infrared light, (b) a first polarizing beamsplitter interface, disposed between the display unit and the viewing unit, for (i) merging a polarized infrared component of the infrared light with the polarized visible light and (ii) separating from the polarized visible light a portion of the polarized infrared component reflected by the eye, and (c) a camera for forming an image of the eye based upon the polarized infrared component reflected by the eye.

18 Claims, 14 Drawing Sheets

(51) Int. Cl.

| | | |
|---|---|---|
| *G06F 3/01* | (2006.01) | |
| *H04N 5/225* | (2006.01) | |
| *H04N 5/33* | (2006.01) | |
| *G02B 27/28* | (2006.01) | |
| *G02B 27/14* | (2006.01) | |
| *G02B 5/12* | (2006.01) | |
| *G02B 5/30* | (2006.01) | |
| *G02B 27/00* | (2006.01) | |

(52) U.S. Cl.
CPC ......... *G02B 27/141* (2013.01); *G02B 27/283* (2013.01); *G06F 3/013* (2013.01); *H04N 5/2256* (2013.01); *H04N 5/332* (2013.01); *G02B 27/0093* (2013.01); *G02B 2027/0112* (2013.01); *G02B 2027/0138* (2013.01); *G02B 2027/0178* (2013.01); *G02B 2027/0181* (2013.01); *G02B 2027/0187* (2013.01)

(58) Field of Classification Search
USPC .................. 359/13, 618–640, 614; 345/7–9; 348/115
See application file for complete search history.

(56) References Cited

U.S. PATENT DOCUMENTS

| | | | |
|---|---|---|---|
| 8,913,789 B1 | 12/2014 | Starner et al. | |
| 8,971,570 B1 | 3/2015 | Raffle et al. | |
| 8,982,471 B1 | 3/2015 | Starner et al. | |
| 9,001,030 B2 * | 4/2015 | Raffle | G02B 27/00 345/156 |
| 9,116,337 B1 * | 8/2015 | Miao | G02B 27/0172 |
| 9,223,152 B1 * | 12/2015 | Kress | G01J 1/4204 |
| 9,519,092 B1 * | 12/2016 | Miao | G02B 5/3083 |
| 2001/0013972 A1 * | 8/2001 | Doany | G02B 27/0172 359/489.11 |
| 2010/0060551 A1 | 3/2010 | Sugiyama et al. | |
| 2011/0213664 A1 | 9/2011 | Osterhout et al. | |
| 2012/0007839 A1 * | 1/2012 | Tsao | G02B 26/00 345/204 |
| 2012/0075452 A1 | 3/2012 | Ferren | |
| 2012/0119978 A1 * | 5/2012 | Border | G02B 27/0172 345/8 |
| 2012/0249797 A1 * | 10/2012 | Haddick | G06F 1/163 348/158 |
| 2013/0016292 A1 * | 1/2013 | Miao | G02B 27/283 349/11 |
| 2013/0021658 A1 | 1/2013 | Miao et al. | |
| 2013/0033756 A1 * | 2/2013 | Spitzer | G02B 27/0172 359/630 |
| 2013/0070338 A1 * | 3/2013 | Gupta | G02B 27/0172 359/485.05 |
| 2013/0077049 A1 | 3/2013 | Bohn | |
| 2013/0127980 A1 * | 5/2013 | Haddick | G06F 3/013 348/14.08 |
| 2013/0241907 A1 * | 9/2013 | Amirparviz | G02B 27/0093 345/207 |
| 2014/0320971 A1 * | 10/2014 | Gupta | G02B 5/02 359/630 |
| 2015/0177831 A1 * | 6/2015 | Chan | G06F 3/013 345/156 |
| 2015/0301593 A1 * | 10/2015 | Border | G06F 3/013 345/156 |
| 2016/0085300 A1 | 3/2016 | Robbins et al. | |
| 2016/0173864 A1 * | 6/2016 | Yu | H04N 13/00 348/51 |
| 2016/0223819 A1 | 8/2016 | Liu et al. | |

OTHER PUBLICATIONS

Taiwan Application No. 104132153, English Translation of first Office Action dated Feb. 20, 2017, 4 pages.

Non-Final Rejection corresponding to U.S. Appl. No. 15/097,137, dated Oct. 17, 2017.

* cited by examiner

1200

SEPARATING INFRARED LIGHT REFLECTED BY THE EYE FROM THE AMBIENT SCENE LIGHT USING THE SECOND BEAMSPLITTER INTERFACE
1210

SEPARATING THE INFRARED LIGHT REFLECTED BY THE EYE FROM THE VISIBLE DISPLAY LIGHT USING THE FIRST BEAMSPLITTER INTERFACE
1220

FIG. 12

1300

GENERATE VISIBLE ILLUMINATION LIGHT
1310

USING A POLARIZING BEAMSPLITTER INTERFACE TO REFLECT ONLY A FIRST POLARIZATION COMPONENT OF THE VISIBLE ILLUMINATION LIGHT TOWARD THE DISPLAY TO ILLUMINATE THE DISPLAY WITH POLARIZED VISIBLE ILLUMINATION LIGHT
1320

EMIT VISIBLE DISPLAY LIGHT FROM THE DISPLAY
1330

TRANSMIT ONLY A SECOND POLARIZATION COMPONENT OF THE VISIBLE DISPLAY LIGHT THROUGH THE POLARIZING BEAMSPLITTER INTERFACE
1340

FIG. 13

NEAR-EYE DISPLAY DEVICE AND METHODS WITH COAXIAL EYE IMAGING

RELATED APPLICATIONS

This application is a continuation in part of U.S. patent application Ser. No. 14/794,725, filed Jul. 8, 2015, which claims priority to Chinese Patent Application No. 201410522328.X, filed Sep. 30, 2014. Both of the above mentioned references are incorporated herein by reference in their entireties.

BACKGROUND

Head-mounted display systems mount to the head of a user and allow the user to view the display or an image thereof. Generally, the display functions as a conveniently located interface with a computer, which may be included in the head-mounted display system. For example, a head-mounted display system may provide an aircraft pilot with maps and other information related to the real scene viewed by the pilot. Some head-mounted display systems allow the user to view a display image at the same time as viewing a real scene. See-through head-mounted display systems overlay a display image on a real scene viewed by the user. Recent advances in micro-optics manufacturing have resulted in the development of see-through head-mounted display systems targeted for the consumer market, where the display system may provide functionality similar to that of a smartphone. For example, U.S. Patent Application Publication No. US 2013/0021658 discusses a see-through head-mounted display system. Conventional head-mounted display systems are controlled by the user through a touch and/or voice control interface.

SUMMARY

In an embodiment, a near-eye display device for mounting in the field of view of an eye of a user supports coaxial eye imaging. This near-eye display device includes a display unit for displaying a display image, a viewing unit for (i) presenting the display image to the eye based upon polarized visible light received from the display unit and (ii) transmitting ambient light from an ambient scene toward the eye and an eye imaging unit for forming an image of the eye. The eye imaging unit includes (a) an illumination module for generating infrared light, (b) a first polarizing beamsplitter interface, disposed between the display unit and the viewing unit, for (i) merging a polarized infrared component of the infrared light with the polarized visible light and (ii) separating from the polarized visible light a portion of the polarized infrared component reflected by the eye, and (c) a camera for forming the image of the eye based upon the portion of the polarized infrared component reflected by the eye.

In an embodiment, a method for performing coaxial eye imaging in a near-eye display device for mounting in field of view of an eye of a user includes using a first polarizing beamsplitter interface to merge polarized infrared light with polarized visible display light from a display. The method further includes using a second polarizing beamsplitter interface to superimpose the polarized infrared light and the polarized visible light on ambient light from an ambient scene to (a) illuminate the eye with the polarized infrared light, (b) present an image of the display to the eye, and (c) allow the eye to view the ambient scene. Additionally, the method includes imaging the eye through the second polarizing beamsplitter interface and the first polarizing beamsplitter interface based upon a portion of the polarized infrared light reflected by the eye.

BRIEF DESCRIPTION OF THE DRAWINGS

The foregoing and other features and advantages of the disclosure will be apparent from the more particular description of embodiments, as illustrated in the accompanying drawings, in which like reference characters refer to the same parts throughout the different figures. The drawings are not necessarily to scale, emphasis instead being placed upon illustrating the principles of the disclosure.

FIG. 12 illustrates a method for directing IR light, reflected by an eye, through a near-eye display device to a camera, according to an embodiment.

FIG. 13 illustrates a method for illuminating a display and generating associated display light, according to an embodiment.

DETAILED DESCRIPTION OF THE EMBODIMENTS

Figure 1:
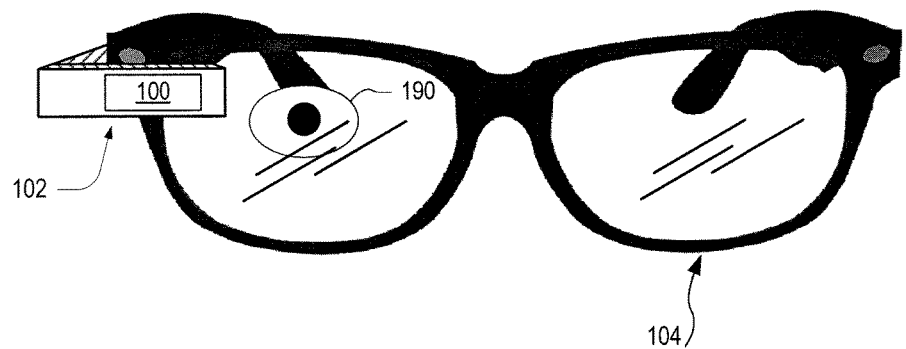
FIG. 1 illustrates a near-eye display device with coaxial eye imaging, according to an embodiment.

FIG. 1 illustrates one exemplary near-eye display device 100 with coaxial eye imaging. Display device 100 is implemented in a near-eye display system 102 configured to position display device 100 near eye 190 of a user. In the example illustrated in FIG. 1, near-eye display system 102 mounts to a glasses frame 104 worn by the user. Alternatively, near-eye display system 102 is mounted to a helmet worn by the user, the head or shoulder of a user, or otherwise placed such that near-eye display device 100 is in the field of view of one eye of the user. Display device 100 is a see-through display device that superimposes a display image on an ambient scene viewed by the user.

Display device 100 is capable of imaging eye 190. In one exemplary use scenario, display device 100 images eye 190 to track the movement of eye 190. In this scenario, display device 100 may display different display images based upon the movement of eye 190 such that the user may control display device 100 through movement of eye 190. In another exemplary use scenario, display device 100 captures an image of eye 190, which includes the iris of eye 190. Display device 100 may utilize such an image of the iris of eye 190 for biometric identification of the user, for example to ensure that the user is authorized to use display device 100. Alternatively, or in combination therewith, display device 100 may utilize an image of the iris of eye 190 to assess certain health related parameters of the user, such as blood sugar, blood alcohol, and/or blood pressure.

Figure 2:
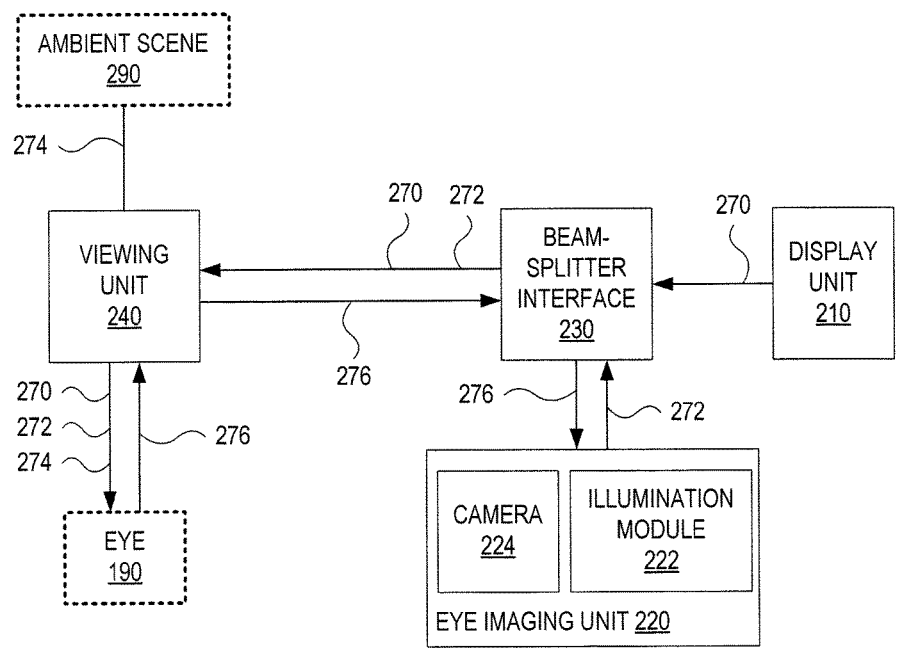
FIG. 2 is a block diagram illustrating the near-eye display device of FIG. 1 in further detail, according to an embodiment.

FIG. 2 is a block diagram illustrating near-eye display device 100 in further detail. Display device 100 includes a display unit 210, an eye imaging unit 220, a beamsplitter interface 230, and a viewing unit 240. Display device 100 implements eye imaging unit 220 such that light associated with imaging of eye 190 propagates coaxially with display light used to present a display image to eye 190. This coaxial propagation simplifies alignment of the eye imaging unit with eye 190, as compared to prior art systems where illumination and/or imaging of eye 190 takes place along an optical path separate from the optical path associated with presenting a display image to the eye. By virtue of the coaxial propagation in display device 100, proper alignment of display light from display unit 210 relative to eye 190 automatically ensures proper alignment of eye imaging unit 220 relative to eye 190. In certain embodiments, the positions of all of display unit 210, eye imaging unit 220, beamsplitter interface 230, and viewing unit 240 are fixed with respect to each other such that the user need only adjust the position of a single physical device, namely display device 100, to achieve proper alignment of both (a) the display image provided by display unit 210 and (b) the eye imaging capability provided by eye imaging unit 220. Beamsplitter interface 230 may be polarizing, non-polarizing, or partially polarizing.

Display unit 210 displays an image and emits visible display light 270, associated with this image, toward beamsplitter interface 230. Visible display light 270 further propagates from beamsplitter interface 230 to viewing unit 240. Viewing unit 240 propagates visible display light 270 to eye 190 in a manner that presents the display image to eye 190. Viewing unit 240 transmits ambient light 274 from an ambient scene 290 such that eye 190 may view ambient scene 290 through viewing unit 240. Accordingly, viewing unit 240 superimposes the display image on ambient scene 290.

Eye imaging unit 220 includes an infrared (IR) illumination module 222 and a camera 224. IR illumination module 222 emits IR light 272, for example in the near-IR spectral range, such as in the range from about 800 nanometers (nm) to about 1000 nm. IR illumination module 222 may include one or more light-emitting diodes and, optionally, other optical components such as one or more lenses and/or optical filters. Camera 224 is configured to image infrared light at least in a spectral range that overlaps with the spectral range of IR light 272. Camera 224 may include an IR-sensitive image sensor and an imaging objective. Camera 224 may further include a spectral filter that filters out unwanted spectral components. In one example, camera 224 includes a spectral filter that blocks visible light.

IR illumination module 222 emits IR light 272 toward beamsplitter interface 230. Beamsplitter interface 230 merges IR light 272 with visible display light 270 such that IR light 272 and visible display light 270 propagate coaxially to viewing unit 240. Viewing unit 240 directs both of IR light 272 and visible display light 270 to eye 190 such that IR light 272, visible display light 270, and ambient light 274 propagate coaxially from viewing unit 240 to eye 190. Eye 190 reflects at least a portion of IR light 272 back toward viewing unit 240. This reflected IR light 276 propagates coaxially (although in opposite direction) with IR light 272, visible display light 270, and ambient light 274 between eye 190 and viewing unit 240, and further propagates coaxially (although in opposite direction) with IR light 272 and visible display light 270 from viewing unit 240 to beamsplitter interface 230. Beamsplitter interface 230 separates reflected IR light 276 from visible display light 270 and directs reflected IR light 276 to camera 224. Camera 224 captures an image of eye 190 based upon reflected IR light 276.

Without departing from the scope hereof, portions of visible display light 270, IR light 272, ambient light 274, and/or reflected IR light 276 may be lost at one or both of beamsplitter interface 230 and viewing unit 240 and propagate in directions different from those shown in FIG. 2.

Figure 3:
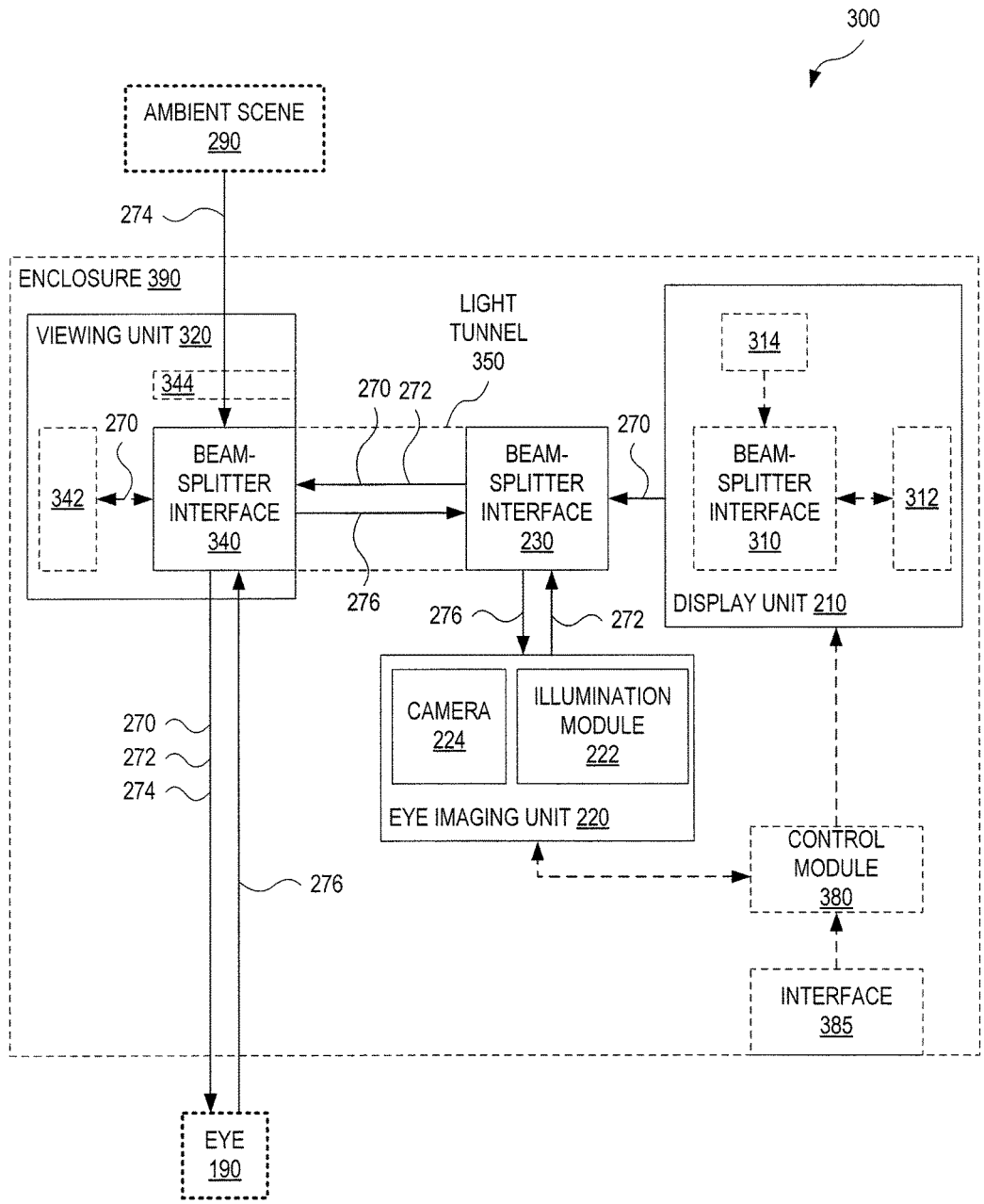
FIG. 3 is a block diagram illustrating another near-eye display device with coaxial eye imaging, according to an embodiment.

FIG. 3 is a block diagram illustrating one exemplary near-eye display device 300 with coaxial eye imaging. Display device 300 is an embodiment of near-eye display device 100. Display device 300 implements viewing unit 240 as a viewing unit 320 that includes a beamsplitter interface 340. Beamsplitter interface 340 merges ambient light 274 with visible display light 270 and IR light 272 to direct all of visible display light 270, IR light 272, and ambient light 274 toward eye 190. Beamsplitter interface 340 may be polarizing, non-polarizing, or partially polarizing.

In an embodiment, viewing unit 320 further includes an imaging objective 342, and beamsplitter interface 340 is configured to direct visible display light 270 toward imaging objective 342. Imaging objective 342 focuses visible display light 270 and redirects visible display light 270 back to beamsplitter interface 340, whereafter beamsplitter interface 340 directs visible display light 270 to eye 190 as discussed above in reference to FIG. 2. In one implementation, imaging objective 342 forms a virtual image located at an apparent distance away from eye 190, optionally externally to display device 300. This virtual image may be formed at infinity or at a finite distance from eye 190. Beamsplitter interface 340 transmits at least a portion of light from ambient scene 290 propagating towards eye 190. Thus, beamsplitter interface 340 provides see-through functionality for display device 300.

In certain embodiments, viewing unit 320 includes an IR filter 344 that removes IR light from ambient light 274 prior to ambient light 274 reaching beamsplitter interface 340 so as to prevent such an IR component of ambient light 274 from reaching camera 224, at least for the spectral IR range detected by camera 224. Thus, IR filter 344 eliminates or reduces background noise in images of eye 190 captured by camera 224. IR filter 344 is, for example, an IR mirror.

Optionally, display device 300 implements display unit 210 with a beamsplitter interface 310, a display 312, and a visible light source 314. Display 312 is, for example, a liquid crystal on silicon (LCOS) display. Beamsplitter interface 310 directs visible illumination light from light source 314 to display 312 to illuminate display 312. Display 312 uses this visible illumination light to display an image, and beamsplitter interface 310 directs visible display light 270 toward beamsplitter interface 230. In one implementation, visible light source 314 includes a light emitting diode (LED) based light source, such as an RGB LED module for generating red, blue, and green light. In this implementation, display 312 and visible light source 314 may cooperate to provide a color display.

In an embodiment, display device 300 includes a light tunnel 350 that connects beamsplitter interfaces 230 and 340, or alternatively connects (e.g., bonds) two optical elements (e.g., beamsplitter cubes) that implement beamsplitter interfaces 230 and 340, respectively. In this embodiment, visible display light 270, IR light 272, and reflected IR light 276 propagate between beamsplitter interface 230 (or associated optical elements such as beamsplitter cubes that implement beamsplitter interfaces 230 and 340) and viewing unit 320. Light tunnel 350 may be a solid material capable of transmitting light of a desired wavelength, such as visible light and IR light. For example, light tunnel 460 may be made of glass or an optical plastic, such as acrylic, polystyrene, polycarbonate, or polyolefin.

Although not shown in FIG. 3, display unit 210 may be directly connected to beamsplitter interface 230 (or an optical element implementing beamsplitter interface 230). For example, a beamsplitter cube implementing beamsplitter interface 310 may be bonded to a beamsplitter cube implementing beamsplitter interface 230. Likewise, eye imaging unit 220 may be connected (e.g., bonded) to beamsplitter interface 230, light tunnel 350, and/or display unit 210. Thus, in one embodiment, display unit 210, eye imaging unit 220, beamsplitter interface 230, light tunnel 350, and viewing unit 320 form a mechanically integrated module.

Optionally, display device 300 includes a control module 380. For example, control module 380 controls one or more of visible light source 314, display 312, IR illumination module 222, and camera 224. Control module 380 may receive one more images from camera 224 to control the image, displayed by display unit 210, according to information about eye 190 as provided by the image(s) captured by camera 224. Display device 300 may further include an interface 385 configured to communicatively couple control module 380 with a user and/or an external computer system. Interface 385 may include a voice interface and/or a touch interface, such as a keypad or a touchpad, for receiving instructions from a user. Through control module 380, such instructions may affect the image formed on display 312. Alternatively, or in combination therewith, interface 385 may include a sound interface for communicating to the user and/or receiving voice commands from the user. While FIG. 3 illustrates control module 380 and interface 385 as being included in display device 300, one or both of control module 380 and interface 385, or portions thereof, may be located externally to display device 300, without departing from the scope hereof. For example, with display device 300 implemented in display system 102 as display device 100, control module 380 and interface 385 may be located in portions of display system 102 different from display device 300. Although not illustrated in FIG. 3, elements of display device 300 may be powered by a battery incorporated in display device 300, or receive power through, for example, interface 385, without departing from the scope hereof.

Display device 300 may further include an enclosure 390 with one opening (not shown in FIG. 3) for receiving ambient light 274 and another opening for optically coupling beamsplitter interface 340 with eye 190.

Figure 4:
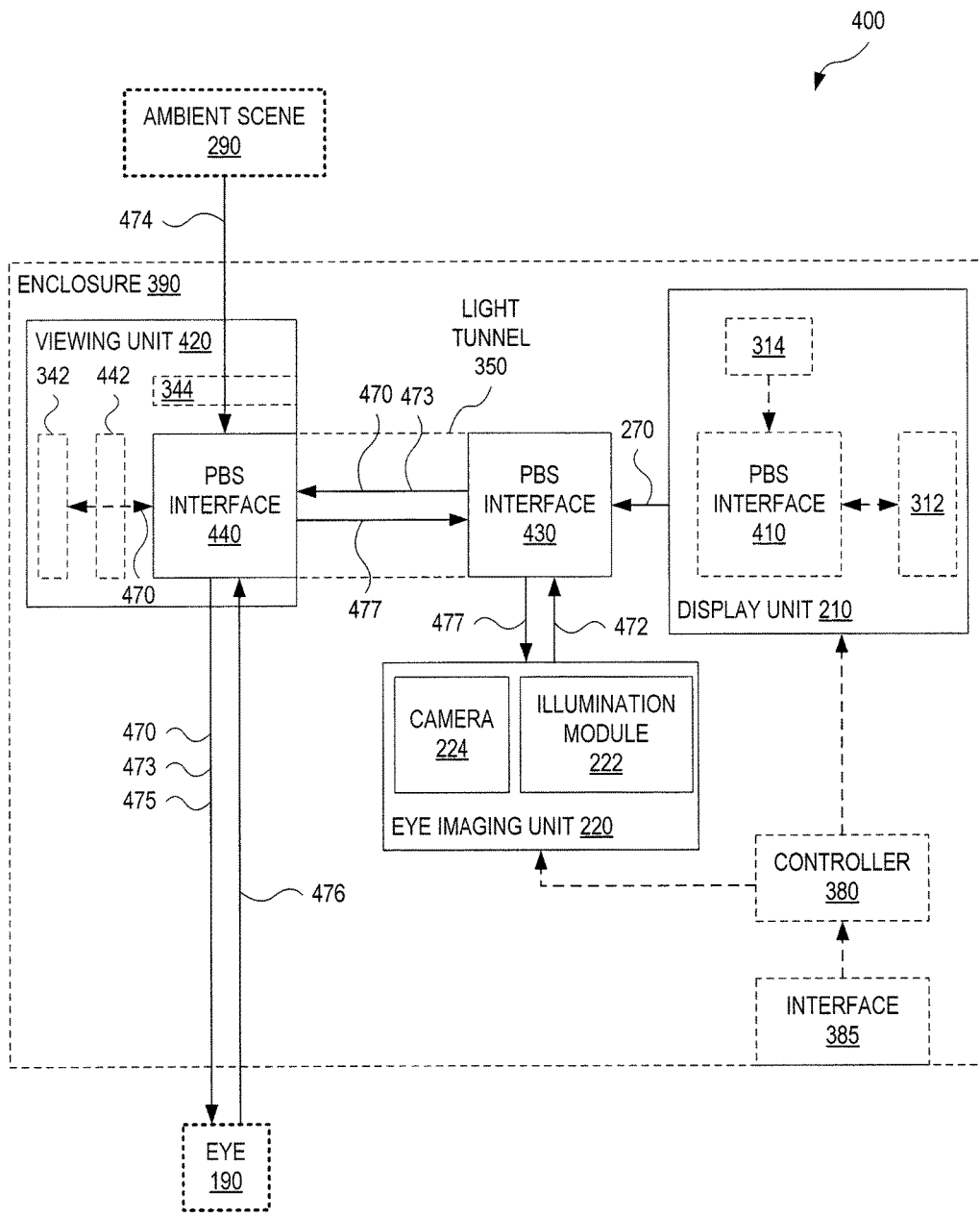
FIG. 4 is a block-diagram illustrating a polarization-based near-eye display device with coaxial eye imaging, according to an embodiment.

FIG. 4 is a block-diagram illustrating one exemplary polarization-based near-eye display device 400 with coaxial eye imaging. Display device 400 is an embodiment of display device 300. Display device 400 implements each beamsplitter interface of display device 300 as a polarizing beamsplitter interface to manage merging and separation of different light components based at least in part on polarization. Specifically, display device 400 implements beamsplitter interface 230, optional beamsplitter interface 310, and beamsplitter interface 340 as polarizing beamsplitter (PBS) interface 430, optional PBS interface 410, and PBS interface 440, respectively.

PBS interface 430 reflects IR light of one polarization component and transmits IR light of the orthogonal polarization component. IR illumination module 222 generates IR light 472, which may or may not be polarized. PBS interface 430 directs one polarization component of IR light 472, i.e., polarized IR light 473 toward PBS interface 440. PBS interface 430 may be configured to reflect or transmit polarized IR light 473 toward PBS interface 440.

PBS interface 430 receives visible display light 270 from display unit 210 and directs polarized visible display light 470 toward PBS interface 440. In one embodiment, visible display light 270 is polarized and polarized visible display light 470 has same type of polarization as visible display light 270. In one example of this embodiment, PBS interface 430 does not have a polarizing function on visible light but is configured to direct at least a portion of visible display light 270 to PBS interface 440. In another example of this embodiment, PBS interface 430 is polarizing also in the visible band and may serve to clean, or at least reduce, imperfections in the polarization of visible display light 270 to produce polarized visible display light 470. In another embodiment, visible display light 270 has polarization properties different from, but not orthogonal to, polarized visible display light 470. In this embodiment, PBS interface 430 is polarizing also in the visible band, and PBS interface 430 selects polarized visible display light 470 from visible display light 270 and directs polarized visible display light 470 toward PBS interface 440.

In the general case, PBS interface 430 either (a) reflects polarized IR light 473 toward PBS interface 440 and transmits polarized visible display light 470 toward PBS interface 440, or (b) transmits polarized IR light 473 toward PBS interface 440 and reflects polarized visible display light 470 toward PBS interface 440. PBS interface 430 may include one or more coatings to achieve this. In one implementation, PBS interface 430 includes one coating with polarizing function in the IR band and another coating with a polarizing function in the visible band. In another implementation, PBS interface 430 includes one broadband coating that has polarizing function both in the IR band and in the visible band. Also in the general case, the polarization of polarized IR light 473 is orthogonal to the polarization of polarized visible display light 470. Herein, "IR band" refers to the spectral range of IR light 472 and "visible band" refers to the spectral range of visible display light 270.

PBS interface 440 is configured to reflect one polarization component and transmit the orthogonal polarization component, wherein PBS interface 440 has same polarizing function in the visible band as in the IR band. In one embodiment, PBS interface 440 transmits light of same polarization as polarized visible display light 470 and reflects light of same polarization as polarized IR light 473. In this embodiment, PBS interface 440 may transmit polarized visible display light 470 to imaging objective 342 through an optional quarterwave plate 442. By virtue of quarterwave plate 442, the polarization of polarized visible display light 470 is rotated 90 degrees when returning to PBS interface 440, and PBS interface 440 then reflects the returned polarized visible display light 470 toward eye 190. PBS interface 440 transmits polarized ambient light 475 received from ambient scene 290 as at least a portion of ambient light 474.

In embodiments of display device 400 that includes PBS interface 410, visible light source 314, and display 312, PBS interface 410 directs one polarization component of visible light from visible light source 314 toward display 312. Display 312 emits visible display light that includes a polarization component transmittable by PBS interface 410, so as to emit visible display light 270 as polarized visible display light 470.

Figure 5A:
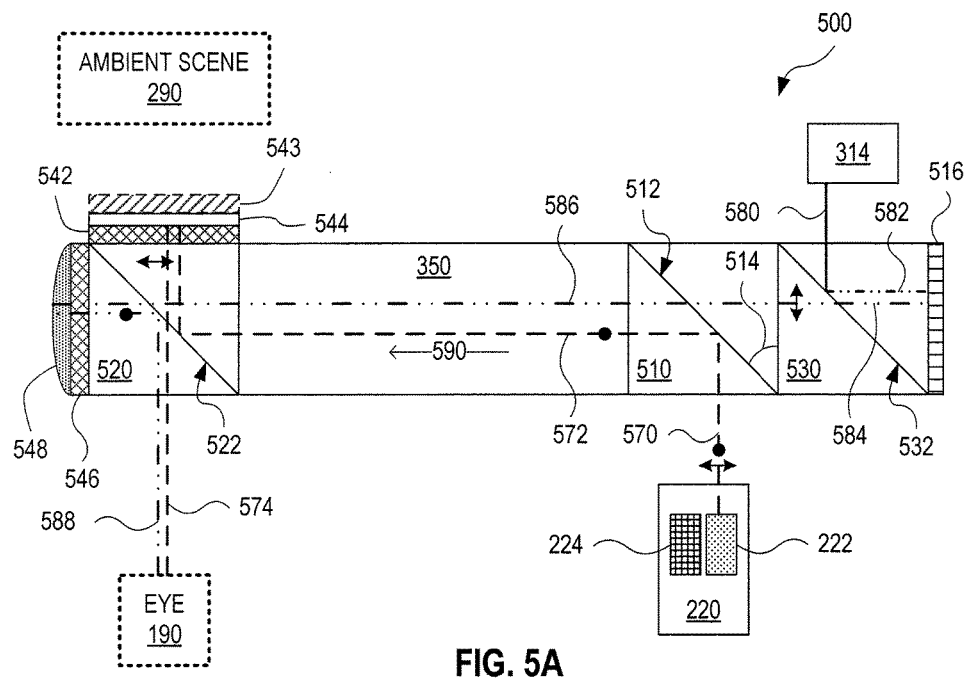
FIGS. 5A, 5B, and 5C illustrate another polarization-based near-eye display device with coaxial eye imaging, according to an embodiment.
Figure 5B:
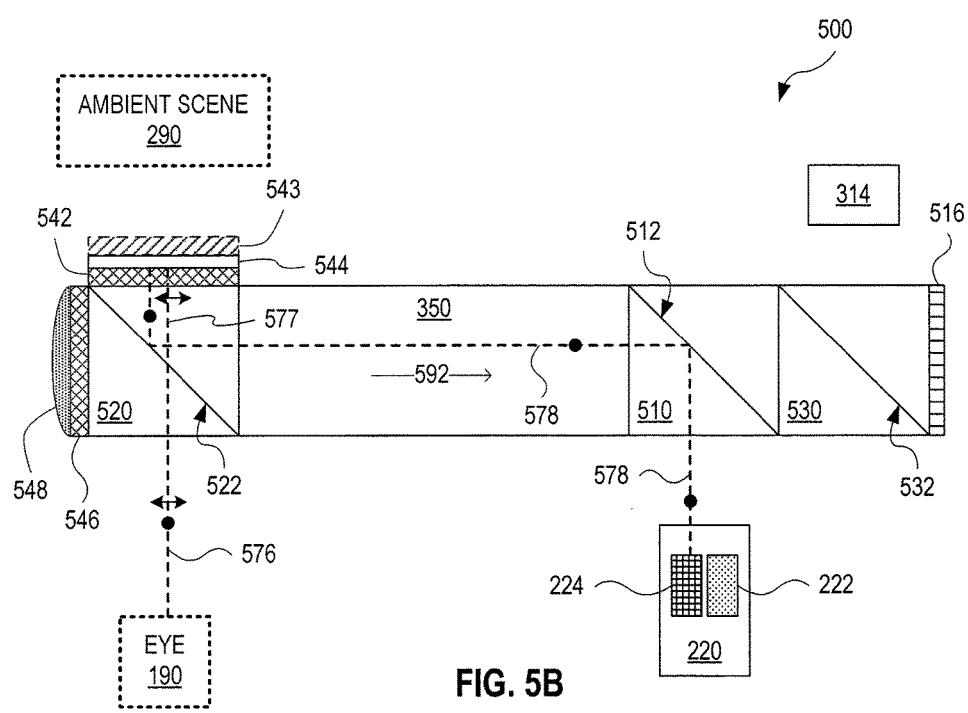
Figure 5C:
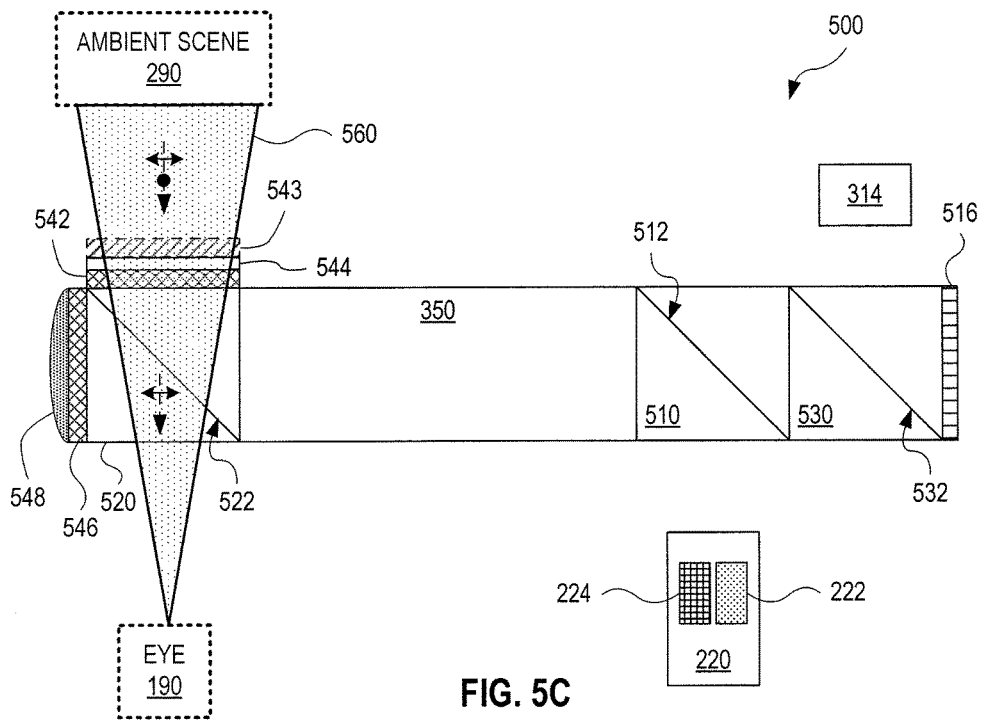

FIGS. 5A, 5B, and 5C illustrate one exemplary polarization-based near-eye display device 500 with coaxial eye imaging. Display device 500 is an embodiment of display device 400. For clarity of illustration, optional control module 380, optional interface 385, and optional enclosure 390 are not shown in FIGS. 5A, 5B, and 5C. FIG. 5A shows propagation of display light and IR light used to illuminate eye 190. FIG. 5B shows propagation of reflected IR light upon which imaging of eye 190 is based. FIG. 5C shows propagation of ambient light from ambient scene 290 to eye 190. FIGS. 5A, 5B, and 5C are best viewed together.

Display device 500 includes beamsplitter cubes 510, 520, and 530 that include PBS interfaces 512, 522, and 532, respectively. PBS interfaces 512, 522, and 532 are embodiments of PBS interfaces 430, 440, and 410, respectively. In an embodiment, each of beamsplitter cubes 510, 520, and 530 is configured with the associated PBS interface at a 45 degree angle 514 as indicated for beamsplitter cube 510. Display device 500 includes light tunnel 350. Display device 500 further includes visible light source 314 and an LCOS display 516. LCOS display 516 is an embodiment of display 312. Beamsplitter cube 530 is connected (e.g., bonded) to beamsplitter cube 510. Light tunnel 350 is connected (e.g., bonded) to beamsplitter cubes 510 and 520.

Display device 500 implements viewing unit 420 with beamsplitter cube 520, an IR-band quarterwave plate 542, an IR-band mirror 544, a visible-band quarterwave plate 546, and a curved reflector 548. IR-band mirror 544 is an embodiment of IR filter 344. Visible-band quarterwave plate 546 is an embodiment of quarterwave plate 442.

IR illumination module 222 generates IR light 570 and emits IR light 570 in the direction toward beamsplitter cube 510 (see FIG. 5A). IR light 570 need not be polarized but includes s-polarized IR light 572. s-polarized IR light 572 is s-polarized with respect to PBS interface 512. PBS interface 512 is configured to reflect s-polarized light and transmit p-polarized light in both the IR band and the visible band. Thus, PBS interface 512 reflects s-polarized IR light 572, received from IR illumination module 222, toward PBS interface 522. s-polarized IR light 572 propagates through light tunnel 350 in a general direction 590. PBS interface 512 is configured to reflect s-polarized light and transmit p-polarized light in both the IR band and the visible band. Thus, PBS interface 522 reflects s-polarized IR light 572, received from light tunnel 350, in the direction toward ambient scene 290, such that s-polarized IR light 572 passes through IR-band quarterwave plate 542, is retro-reflected by IR band mirror 544, passes through IR-band quarterwave plate 542 again, and then propagates toward PBS interface 522 in the direction toward eye 190 as p-polarized IR light 574. PBS interface 522 transmits s-polarized IR light 572 toward eye 190, such that s-polarized IR light 572 illuminates eye 190.

Visible light source 314 generates visible light 580 (see FIG. 5A). PBS interface 532 reflects a portion 582 of visible light 580 toward LCOS display 516 to illuminate LCOS display 516. Portion 582 is s-polarized, for example. LCOS display 516 emits visible display light 584 in the direction toward PBS interface 532. LCOS display 516 generates visible display light 584 from portion 582. PBS interface 532 transmits p-polarized visible display light 586 which is at least a portion of visible display light 584. p-polarized visible display light 586 is transmitted by PBS interface 512, propagates through light tunnel 350 along direction 590, is transmitted by PBS interface 522, passes through visible-band quarterwave plate 546, is retro-reflected and focused by curved reflector 548, passes through visible-band quarterwave plate 546 again, and then propagates toward PBS interface 522 in the direction toward light tunnel 350 as s-polarized visible display light 588. However, PBS interface 522 reflects s-polarized visible display light 588 toward eye 190 to present a virtual image of LCOS display 516 to eye 190.

For clarity of illustration FIG. 5A shows light propagation as straight lines that do not overlap. However, it is understood that light, such as display light and IR illumination light, propagates through display device 500 as beams that have non-zero extent and are possibly diverging or converging, and also that different beams may overlap. For example, p-polarized visible display light 586 and s-polarized IR light 572 may be overlapping beams between PBS interfaces 512 and 522.

A portion of p-polarized IR light 574 is reflected by eye 190 as reflected IR light 576 (see FIG. 5B). Reflected IR light 576 may include both p-polarized and s-polarized components. PBS interface 522 transmits p-polarized reflected IR light 577 which is a portion of reflected IR light 576. p-polarized reflected IR light 577 passes through IR-band quarterwave plate 542, is reflected by IR-band mirror 544, passes through IR-band quarterwave plate 542 again, and then propagates toward PBS interface 522 as s-polarized reflected IR light 578. PBS interface 522 reflects s-polarized reflected IR light 578 toward PBS interface 512. s-polarized reflected IR light 578 propagates through light tunnel 350 toward PBS interface 512 along a general direction 592 opposite direction 590. PBS interface 512 reflects s-polarized reflected IR light 578 toward camera 224. Camera 224 captures an image of eye 190 based upon s-polarized reflected IR light 578.

The polarization management of IR light 570, and components thereof, throughout display device 500 minimizes the risk of IR light 570 being reflected back to eye 190 through other means than the intended reflection off of eye 190. As a result, images of eye 190 captured by camera 224 have minimal noise contribution from undesirable back-reflection of IR light 570. Without departing from the scope hereof, any of PBS interfaces 512, 522, and 532 may transmit (reflect) a small amount of light having polarization orthogonal to the polarization direction that the PBS interface is designed to transmit (reflect). This may occur, for example, if light is incident on one of PBS interfaces 512, 522, and 532 at an angle significantly away from the design angle of the PBS interface.

Ambient light 560 propagating from ambient scene 290 through PBS interface 522 to eye 190 may be of any polarization (see FIG. 5C). However, transmission of ambient light 560 by PBS interface 522 is substantially limited to a p-polarized component of ambient light 560. If ambient scene 290 is very close to display device 500, ambient light 560 may include light having angles of incidence onto PBS interface 522 sufficiently far away from the design angle of incidence for PBS interface 522 that some s-polarized light will leak through PBS interface 522 to eye 190. In any case, eye 190 will be able to receive at least a portion of ambient light 560 and thus be able to view ambient scene 290 through display device 500.

Ambient light 560 may include a spectral component in the IR band. However, this component is reflected away from display device 500 by IR-band mirror 544 and therefore does not contribute to background in images of eye 190 captured by camera 224.

Optionally, viewing unit 420, as implemented in display device 500, further includes a polarization filter 543 that allows only transmission of p-polarized ambient light 560 into beamsplitter cube 520. This minimizes the risk of ambient light 560 being reflected by PBS interface 522 toward LCOS display 516 and/or camera 224.

Figure 6:
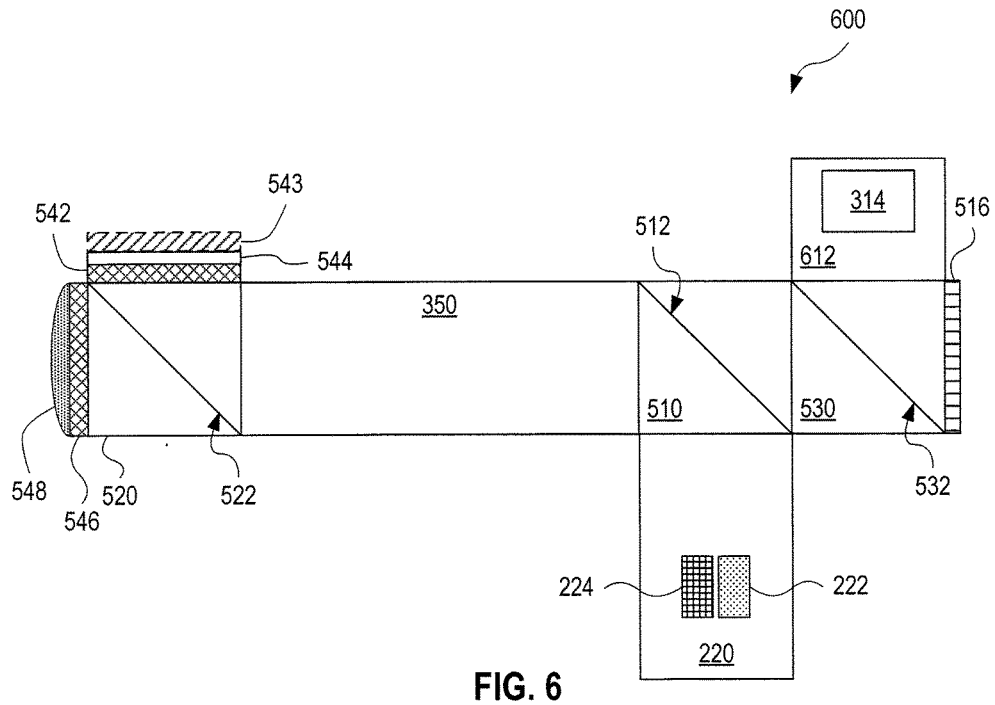
FIG. 6 illustrates a polarization-based near-eye display device with coaxial eye imaging, wherein an eye imaging unit is connected to one beamsplitter cube and a visible light source is implemented in an assembly that is connected to another beamsplitter cube, according to an embodiment.

FIG. 6 illustrates one exemplary polarization-based near-eye display device 600 with coaxial eye imaging. Display device 600 is an embodiment of display device 500. In display device 600, eye imaging unit 220 is connected to beamsplitter cube 510 and visible light source 314 is implemented in an assembly 612 that is connected to beamsplitter cube 530. Eye imaging unit 220 may be bonded to beamsplitter cube 510 and, optionally (not shown in FIG. 6), light tunnel 350 and/or beamsplitter cube 530. Likewise, assembly 612 may be bonded to beamsplitter cube 530 and, optionally (not shown in FIG. 6), beamsplitter cube 510. For clarity of illustration, optional control module 380, optional interface 385, and optional enclosure 390 are not shown in FIG. 6.

Figure 7:
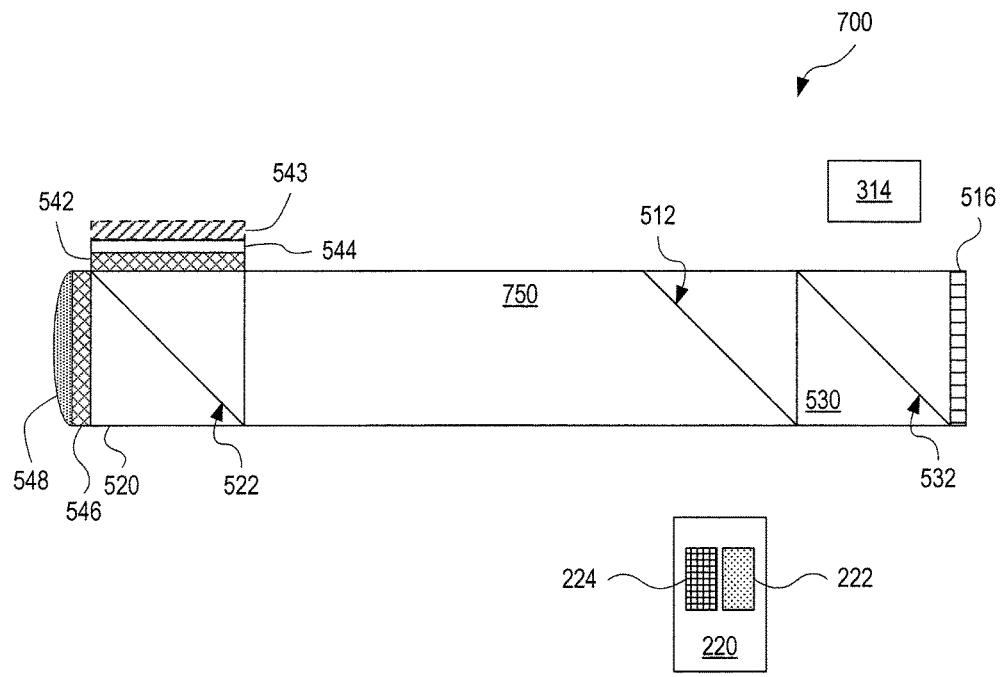
FIG. 7 illustrates a polarization-based near-eye display device with coaxial eye imaging, which includes a light tunnel that implements a polarizing beamsplitter interface, according to an embodiment.

FIG. 7 illustrates one exemplary polarization-based near-eye display device 700 with coaxial eye imaging. Display device 700 is an embodiment of display device 400. Display device 700 is similar to display device 500 except for light tunnel 350 and beamsplitter cube 510 being replaced by a light tunnel 750 implementing PBS interface 512. Although not shown in FIG. 7, eye imaging unit 220 may be connected to light tunnel 750 in a manner similar to that shown in FIG. 6, without departing from the scope hereof. Likewise, display device 700 may implement visible light source 314 in assembly 612 as shown in FIG. 6, without departing from the scope hereof. For clarity of illustration, optional control module 380, optional interface 385, and optional enclosure 390 are not shown in FIG. 7.

Figure 8:
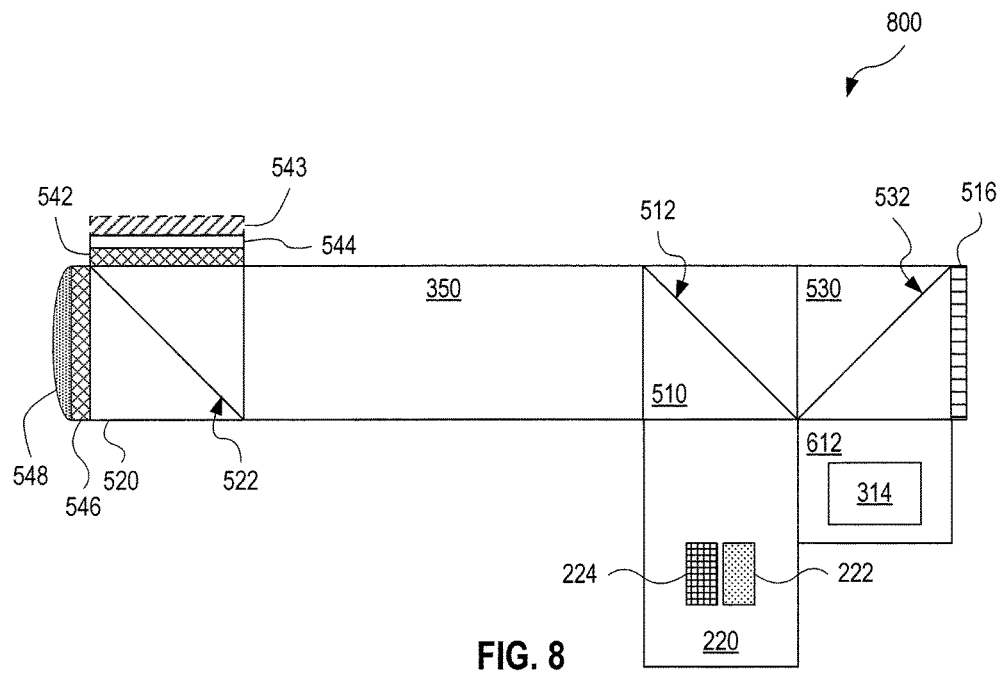
FIG. 8 illustrates another polarization-based near-eye display device with coaxial eye imaging, according to an embodiment.

FIG. 8 illustrates one exemplary polarization-based near-eye display device 800 with coaxial eye imaging. Display device 800 is an embodiment of display device 400. Display device 800 is similar to display device 600 except that the orientation of beamsplitter cube 530 in display device 800 is rotated, as compared to the configuration of display device 600, such that assembly 612 is adjacent eye imaging unit 220. Assembly 612 may be disposed a distance away from eye imaging unit 220, without departing from the scope hereof. For clarity of illustration, optional control module 380, optional interface 385, and optional enclosure 390 are not shown in FIG. 8.

Without departing from the scope hereof, the orientation of beamsplitter cube 530 in display device 800 may be applied to any of display devices 500 and 700 as well as display devices 900 and 1000 discussed below in reference to FIGS. 9 and 10.

Figure 9:
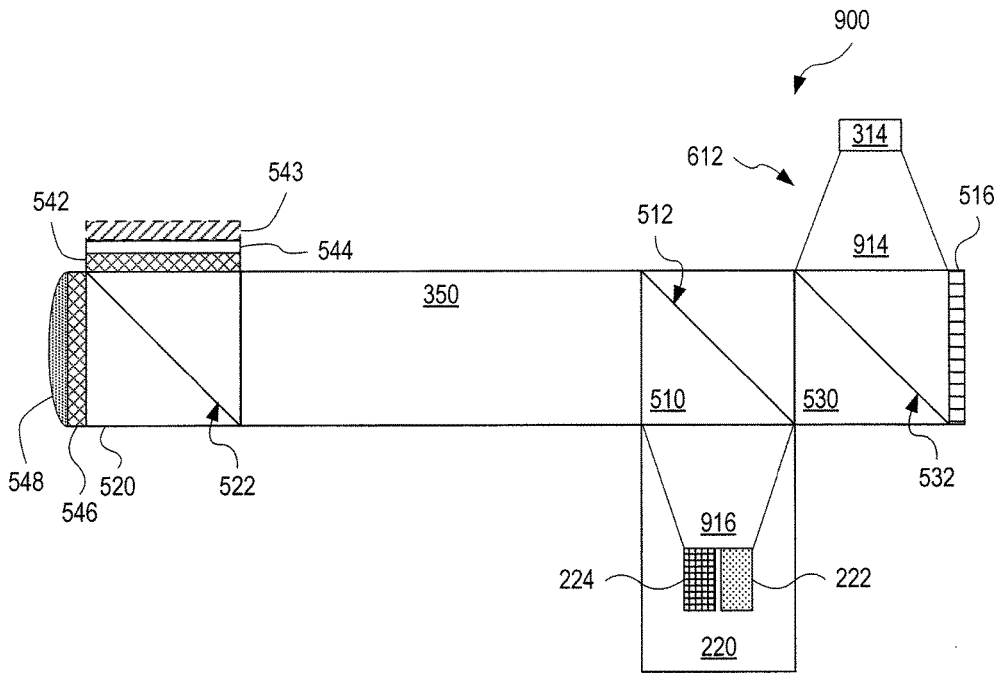
FIG. 9 illustrates a polarization-based near-eye display device with coaxial eye imaging, which includes tapered light tunnels, according to an embodiment.

FIG. 9 illustrates one exemplary polarization-based near-eye display device 900 with coaxial eye imaging. Display device 900 is an embodiment of display device 600. In display device 900, eye imaging unit 220 includes a tapered light tunnel 916 that couples (a) IR light, generated by IR illumination module 222, to beamsplitter cube 510 and (b) IR light reflected by eye 190 to camera 224 from beamsplitter cube 510. In addition, display device 900 implements assembly 612 with a tapered light tunnel 914 that couples visible light, generated by visible light source 314, to beamsplitter cube 530. Tapered light tunnels 914 and 916 may have material properties similar to those of light tunnel 350. For clarity of illustration, optional control module 380, optional interface 385, and optional enclosure 390 are not shown in FIG. 9.

Without departing from the scope hereof, tapered light tunnels 914 and 916 may be implemented in any of display devices 700, 800, and 1000 (discussed below in reference to FIG. 10).

Figure 10:
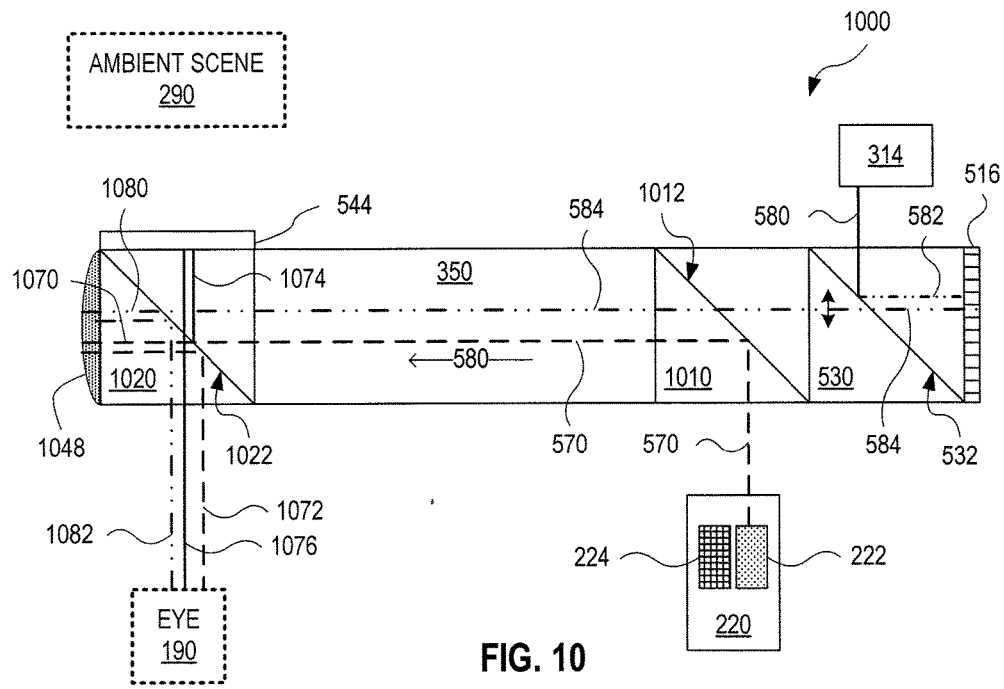
FIG. 10 illustrates yet another near-eye display device with coaxial eye imaging, according to an embodiment.

FIG. 10 illustrates one exemplary near-eye display device 1000 with coaxial eye imaging. Display device 1000 is an embodiment of display device 300. Display device 1000 is similar to display device 500 except that (a) beamsplitter cubes 510 and 520 are replaced with beamsplitter cubes 1010 and 1020, respectively, (b) IR-band quarterwave plate 542 and visible-band quarterwave plate 546 are omitted from display device 1000, and (c) curved reflector 548 is replaced by a curved reflector 1048. Curved reflector 1048 is configured to reflect both visible-band and IR-band light.

Beamsplitter cubes 1010 and 1020 include beamsplitter interfaces 1012 and 1022, respectively. Beamsplitter interfaces 1012 and 1022 are embodiments of beamsplitter interfaces 230 and 340, respectively. Beamsplitter interface 1012 has a transmission coefficient of at least 50% for visible-band light and a reflection coefficient of at least 50% for IR-band light, substantially regardless of polarization. In one example, beamsplitter interface 1012 has a nearly 100% transmission coefficient for visible-band light and a nearly 100% reflection coefficient for IR-band light, substantially regardless of polarization. The transmission to reflection ratio for beamsplitter interface 1022 is substantially 50%/50% for both IR-band light and visible-band light, regardless of polarization.

In operation, visible light source 314 generates visible light 580, which results in (see above discussion in reference to FIG. 5) polarized visible display light 584 propagating from beamsplitter cube 530 to beamsplitter cube 1010. At least 50%, and in one embodiment nearly 100%, of polarized visible display light 584 is transmitted by beamsplitter interface 1012 and propagates through light tunnel 350 to beamsplitter cube 1020. Beamsplitter interface 1022 transmits a portion 1080 of polarized visible display light 584 toward curved reflector 1048. Curved reflector 1048 focuses and retro-reflects portion 1080 toward beamsplitter interface 1022. Beamsplitter interface 1022 reflects a portion 1082 of portion 1080 toward eye 190 to present to eye 190 an image of LCOS display 516. Curved reflector 1048 has focusing properties similar to those of curved reflector 548. Up to approximately 25% of polarized visible display light 584, delivered by beamsplitter cube 530, is transmitted to eye 190.

Also in operation, IR illumination module 222 generates IR light 570. At least 50%, and in one embodiment nearly 100%, of IR light 570 is reflected by beamsplitter interface 1012 and propagates through light tunnel 350 to beamsplitter cube 1020. Beamsplitter interface 1022 transmits a portion 1070 of IR light 570 toward curved reflector 1048. Curved reflector 1048 focuses and retro-reflects portion 1070 toward beamsplitter interface 1022. Beamsplitter interface 1022 reflects a portion 1072 of portion 1070 toward eye 190 to illuminate eye 190 with IR light. In addition, beamsplitter interface 1022 reflects a portion 1074 of IR light 570 toward IR-band mirror 544. IR-band mirror 544 retro-reflects portion 1074 to beamsplitter interface 1022. Beamsplitter interface 1022 transmits a portion 1076 of portion 1074 toward eye 190 to provide further IR illumination of eye 190. Up to approximately 50% of IR light 570, generated by IR illumination module 222, is transmitted to eye 190.

Eye 190 reflects some of the IR light, incident on eye 190 as portions 1072 and 1076, back toward beamsplitter interface 1022. Some of this reflected IR light propagates back to eye imaging unit 220 along optical paths propagating in opposite direction to the optical paths associated with IR light 570 and components thereof, as discussed above. Camera 224 captures an image of eye 190 based upon this reflected IR light.

Ambient light from ambient scene 290 propagates through IR-band mirror 544 and beamsplitter interface 1022 in a manner similar to that discussed for display device 500, except that approximately 50% of the ambient light is lost on beamsplitter interface 1022.

Figure 11:
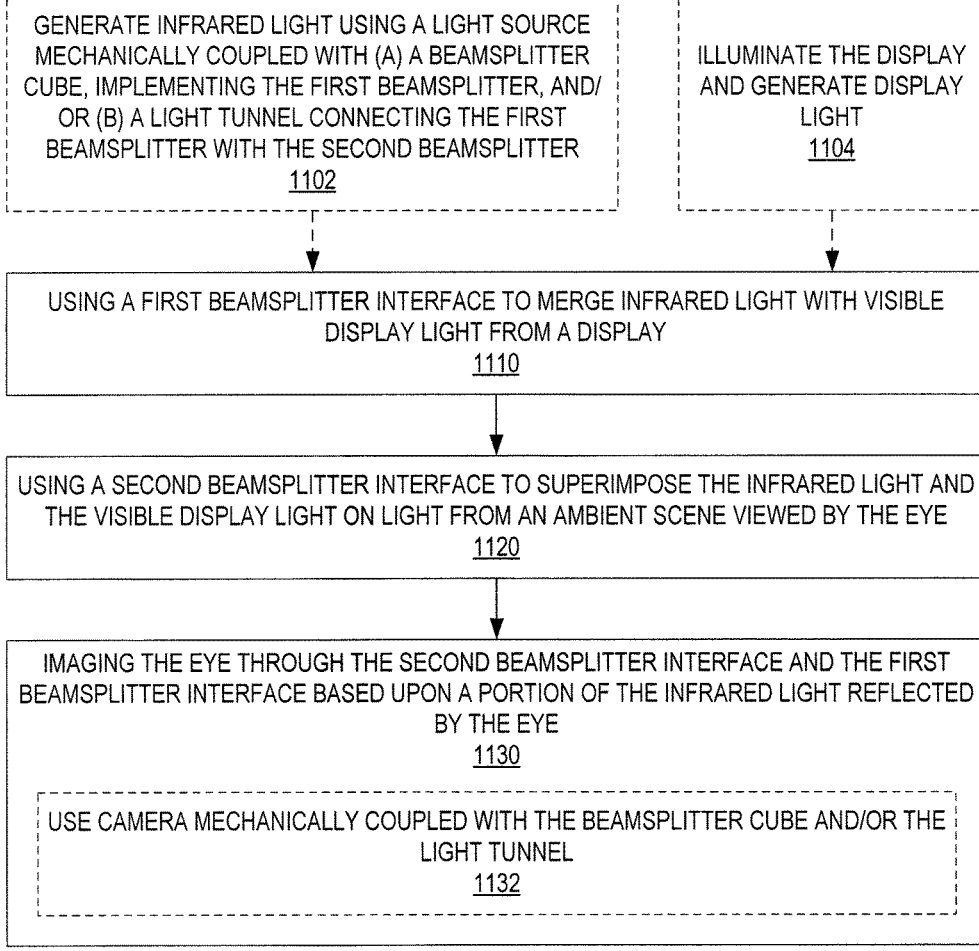
FIG. 11 illustrates a method for performing coaxial eye imaging in a near-eye display device, according to an embodiment.

FIG. 11 illustrates one exemplary method 1100 for performing coaxial eye imaging in a near-eye display device. Method 1100 is for example performed by display device 300.

In a step 1110, method 1100 uses a first beamsplitter interface to merge IR light with visible display light from a display. In one example of step 1110, beamsplitter interface 230 of display device 300 merges IR light 272 with visible display light 270.

In a step 1120, method 1100 uses a second beamsplitter interface to superimpose the IR light and visible display light, of step 1110, on light from an ambient scene viewed by the eye. In one example of step 1120, beamsplitter interface 340 of display device 300 superimposes IR light 272 and visible display light 270 on ambient light 274.

In a step 1130, method 1100 images the eye through the second beamsplitter interface and the first beamsplitter interface based upon a portion of the IR light, of step 1120, reflected by the eye. In one example of step 1130, camera 224 detects reflected IR light 276 to capture an image of eye 190. Control module 380 may activate IR illumination module 222 for a finite duration to illuminate eye 190 with at least a portion of IR light 272 during this finite duration. Control module 380 may further be configured to induce capture of the image of eye 190 during this finite duration, based upon reflected IR light 276.

In an embodiment, method 1100 further includes a step 1102, and step 1130 includes a step 1132. Step 1102 generates infrared light using a light source that is mechanically coupled with (a) a beamsplitter cube, implementing the first beamsplitter, and/or (b) a light tunnel connecting the first beamsplitter with the second beamsplitter. Step 1132 images the eye using a camera that is mechanically with the beamsplitter cube and/or light tunnel of step 1102. In one example of this embodiment, method 1100 utilizes an embodiment of display device 300 wherein eye imaging unit 220 is connected to (a) at least one of beamsplitter cube 510 and light tunnel 350, (b) light tunnel 750, or (c) at least one of beamsplitter cube 1010 and light tunnel 350, as discussed above in reference to FIGS. 6-10.

Optionally, method 1100 also includes a step 1104 of illuminating the display and generating the display light. In one example of step 1104, visible light source 314 illuminates display 312 such that display 312 emits visible display light. This example of step 1104 may further include polarization filtering of the visible display light by beamsplitter interface 310.

FIG. 12 illustrates one exemplary method 1200 for directing the reflected IR light to a camera in step 1130 of method 1100. In a step 1210, method 1200 separates IR light reflected by the eye from the ambient scene light using the second beamsplitter interface of step 1120. In one example of step 1210, beamsplitter interface 340 separates reflected IR light 276 from ambient light 274. In a step 1220, method 1200 separates IR light reflected by the eye from the visible display light using the first beamsplitter interface of step 1110. In one example of step 1220, beamsplitter interface 230 separates reflected IR light 276 from visible display light 270.

FIG. 13 illustrates one exemplary method 1300 for illuminating a display and generating associated display light. Method 1300 is an embodiment of step 1104 of method 1100 and may be performed by display unit 210 as implemented in any of display devices 500, 600, 700, 800, 900, and 1000.

In a step 1310, method 1300 generates visible illumination light. In one example of step 1310, visible light source 314 generates visible light 580.

In a step 1320, method 1300 uses a polarizing beamsplitter interface to reflect substantially only a first polarization component of the visible illumination light toward a display. Step 1320 thus illuminates the display with polarized visible illumination light. In one example of step 1320, PBS interface 532 reflects an s-polarized portion 582 of visible light 580 toward LCOS display 516.

In a step 1330, the display emits visible display light. In one example of step 1330, LCOS display 516 emits visible display light 584 generated from s-polarized portion 582 based upon settings of LCOS display 516. These settings are, for example, defined by control module 380.

In a step 1340, substantially only a second polarization component of the visible display light, emitted in step 1330, is transmitted through the polarizing beamsplitter interface of step 1320, to produce polarized visible display light. This second polarization component is orthogonal to the first polarization component. In one example of step 1340, PBS interface 532 transmits p-polarized visible display light 586, wherein p-polarized display light 586 is a component of visible display light 584.

Figure 14:
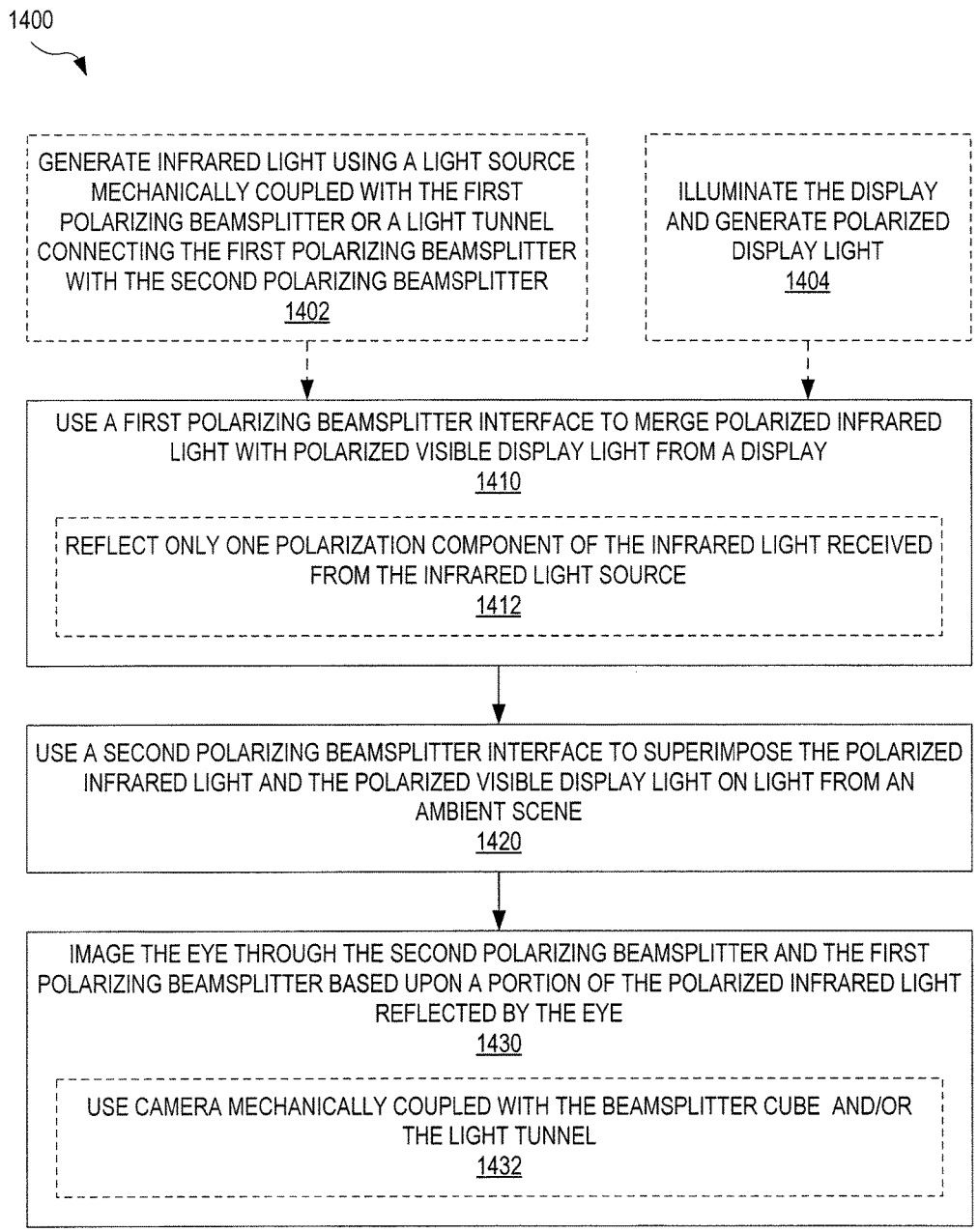
FIG. 14 illustrates a polarization-based method for performing coaxial eye imaging in a near-eye display device, according to an embodiment.

FIG. 14 illustrates one exemplary polarization-based method 1400 for performing coaxial eye imaging in a near-eye display device. Method 1400 is an embodiment of method 1100. Method 1400 is, for example, performed by display device 400.

In a step 1410, method 1400 uses a first polarizing beamsplitter interface to merge polarized IR light with polarized visible display light from a display. In one example of step 1410, PBS interface 430 of display device 400 merges polarized IR light 473 with visible display light polarized visible display light 470.

In an embodiment, step 1410 includes a step 1412 of reflecting only one polarization component of the IR light received from the IR light source. In one example of step 1412, PBS interface 512 of any of display devices 500, 600, 700, 800, and 900 merges s-polarized IR light 572 with p-polarized visible display light 586 by reflecting s-polarized IR light 572 in the same direction as the propagation direction of p-polarized visible display light 586 transmitted by PBS interface 512.

In a step 1420, method 1100 uses a second polarizing beamsplitter interface to superimpose the polarized IR light and polarized visible display light, of step 1410, on light from an ambient scene viewed by the eye. Step 1420 thus directs both the polarized IR light and polarized visible display light to the eye, so as to illuminate the eye with IR light and present a display image to the eye. In one example of step 1420, PBS interface 440 of display device 400 superimposes polarized IR light 473 and polarized visible display light 470 on ambient light 474. In another example of step 1420, beamsplitter interface 522 of any of display devices 500, 600, 700, 800, and 900 superimposes p-polarized IR light 574 and s-polarized visible display light 588 on ambient light 560.

In a step 1430, method 1400 images the eye through the second polarizing beamsplitter interface and the first polarizing beamsplitter interface based upon a portion of the IR light, of step 1420, reflected by the eye. In one example of step 1430, camera 224 detects polarized reflected IR light 477 to capture an image of eye 190. In another example of step 1430, camera 224 detects s-polarized reflected IR light 578 to capture an image of eye 190. In an embodiment, step 1430 includes method 1200 implemented with each of the first and second beamsplitter interfaces being polarizing beamsplitter interfaces, such as PBS interfaces 512 and 522, as discussed above in reference to FIG. 5B. Step 1430 may utilize control module 380 as discussed above for step 1130 in reference to FIG. 11.

In an embodiment, method 1400 further includes a step 1402, and step 1430 includes a step 1432. Step 1402 is similar to step 1102 and step 1432 is similar to step 1132. In one example of this embodiment, method 1400 utilizes an embodiment of display device 400 wherein eye imaging unit 220 is connected to (a) at least one of beamsplitter cube 510 and light tunnel 350 or (b) light tunnel 750, as discussed above in reference to FIGS. 6-9.

Optionally, method 1400 also includes a step 1404 of illuminating the display and generating the display light. In one example of step 1404, visible light source 314 illuminates display 312 such that display 312 emits visible display light, which is subsequently polarization filtered by PBS interface 410. Another example of step 1404 utilizes visible light source 314, PBS interface 532, and LCOS display 516, as discussed above in reference to method 1300.

Figure 15:
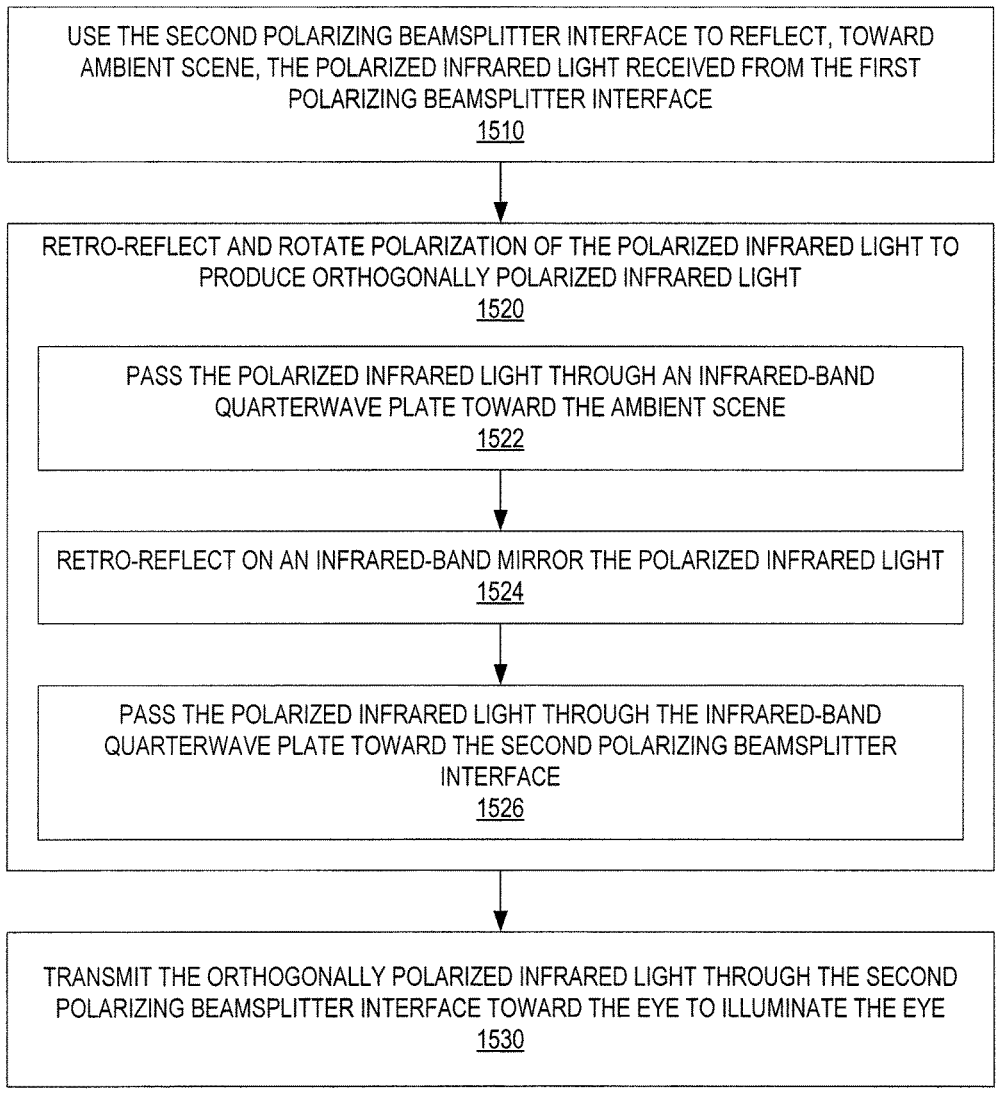
FIG. 15 illustrates a method for directing polarized IR light through a near-eye display device toward an eye to illuminate the eye, according to an embodiment.

FIG. 15 illustrates one exemplary method 1500 for directing the polarized IR light toward eye 190 in step 1420 to illuminate the eye. Method 1500 is for example performed by any of display devices 400, 500, 600, 700, 800, and 900.

In a step 1510, method 1500 uses the second polarizing beamsplitter interface to reflect, toward the ambient scene, the polarized IR light received from the first polarizing beamsplitter interface. In one example of step 1510, PBS interface 522 reflects s-polarized IR light 572 toward ambient scene 290.

In a step 1520, method 1500 retro-reflects and rotates the polarization of the polarized IR light, reflected by the second polarizing beamsplitter interface in step 1510, to produce orthogonally polarized IR light. Step 1510 includes steps 1522, 1524, and 1526. In step 1522, method 1500 passes the polarized IR light through an IR-band quarterwave plate toward the ambient scene. In one example of step 1522, s-polarized IR light 572 passes through IR-band quarterwave plate 542 to form circularly polarized IR light. In step 1524, method 1500 retro-reflects the circularly polarized IR light on an IR-band mirror. In one example of step 1524, the circularly polarized IR light, generated by passing s-polarized IR light 572 through IR-band quarterwave plate 542, is retro-reflected by IR-band mirror 544. In step 1526, method 1500 passes the circularly polarized IR light, retro-reflected in step 1524, through the IR-band quarterwave plate again to form orthogonally polarized IR light. In one example of step 1526, the circularly polarized IR light, retro-reflected by IR-band mirror 544, passes through IR-band quarterwave plate 542 to form p-polarized IR light 574 propagating toward PBS interface 522.

In a step 1530, method 1500 transmits the orthogonally polarized IR light, produced in step 1520, through the second polarizing beamsplitter interface toward the eye to illuminate the eye. In one example of step 1530, PBS interface 522 transmits p-polarized IR light 574 toward eye 190 to illuminate eye 190.

Figure 16:
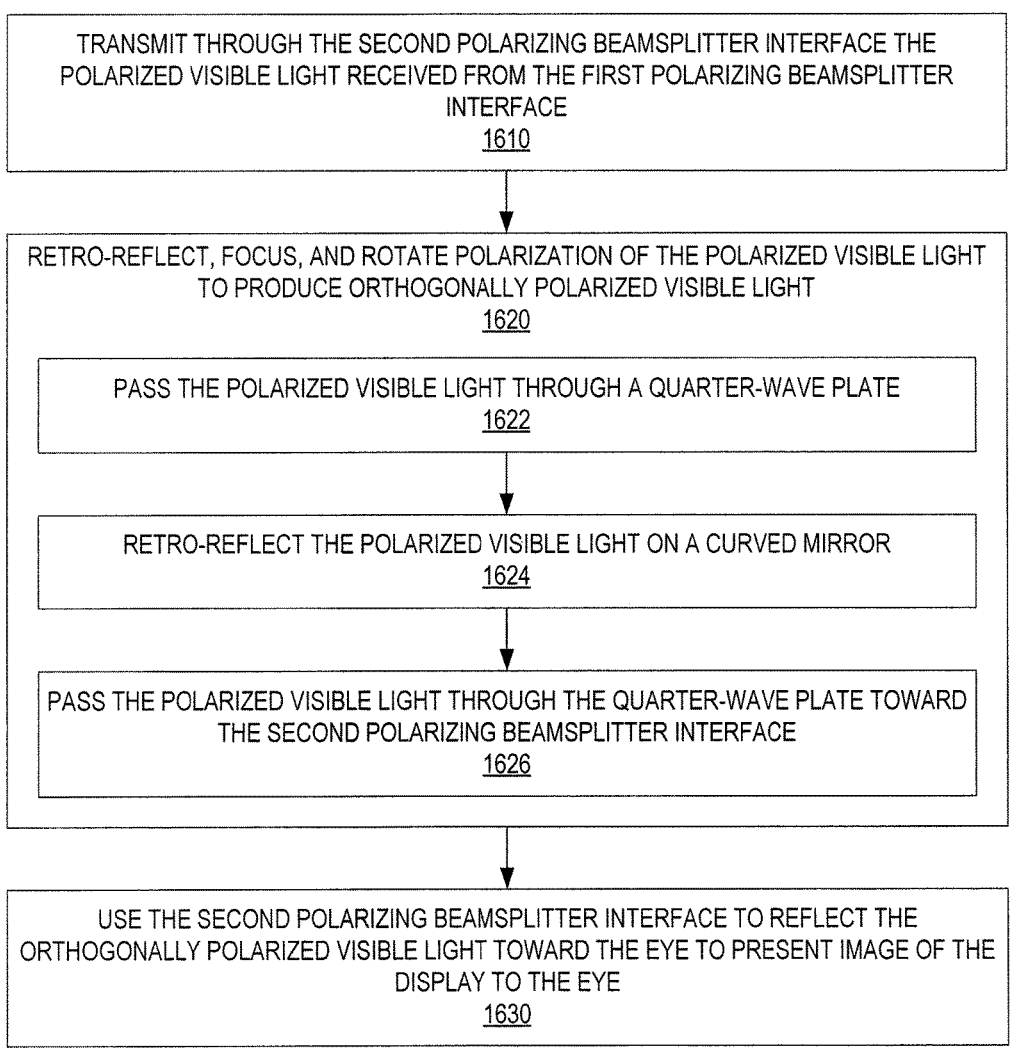
FIG. 16 illustrates a method for directing polarized visible display light through a near-eye display device toward an eye to present a display image to the eye, according to an embodiment.

FIG. 16 illustrates one exemplary method 1600 for directing the polarized visible display light toward eye 190 in step 1420 to present a display image to the eye. Method 1600 is for example performed by any of display devices 400, 500, 600, 700, 800, and 900.

In a step 1610, method 1600 transmits, through the second polarizing beamsplitter interface, the polarized visible display light received from the first polarizing beamsplitter interface. In one example of step 1610, PBS interface 522 transmits p-polarized visible display light 586.

In a step 1620, method 1600 retro-reflects, focuses, and rotates the polarization of the polarized visible display light, transmitted by the second polarizing beamsplitter interface in step 1610, to produce orthogonally polarized visible display light. Step 1610 includes steps 1622, 1624, and 1626. In step 1622, method 1600 passes the polarized visible display light through a visible-band quarterwave plate. In one example of step 1622, p-polarized visible display light 586 passes through visible-band quarterwave plate 546 to form circularly polarized visible display light. In step 1624, method 1600 retro-reflects the circularly polarized visible display light on a visible-band mirror. In one example of step 1624, the circularly polarized visible display light, generated by passing p-polarized visible display light 586 through visible-band quarterwave plate 546, is retro-reflected by curved reflector 548. In step 1626, method 1600 passes the circularly polarized IR light, retro-reflected in step 1624, through the visible-band quarterwave plate again to form orthogonally polarized visible display light. In one example of step 1626, the circularly polarized visible display light, retro-reflected by curved reflector 548, passes through visible-band quarterwave plate 546 to form s-polarized visible display light 588 propagating toward PBS interface 522.

In a step 1630, method 1600 reflects the orthogonally polarized visible display light, produced in step 1620, on the second polarizing beamsplitter interface toward the eye to present a display image to the eye. In one example of step 1630, PBS interface 522 reflects s-polarized visible display light 588 toward eye 190 to present a display image (for example an image of LCOS display 516) to eye 190.

Additional Embodiments

The following discloses additional embodiments of display device 100. These embodiments are referred to in as "head-mounted display apparatus".

In one embodiment, a head-mounted apparatus is provided, including:
 a reflective microdisplay;
 a visible light source configured to illuminate the microdisplay;
 an illumination optics unit configured to direct visible light emanated from the visible light source into the microdisplay, and allow light reflected from the microdisplay in the form of an image to pass therethrough and transmit along an optical axis;
 an imaging optics unit configured to project the image from the microdisplay into an eye of a user; and
 an eye tracker module, including:
 an invisible light source configured to emanate an invisible light beam into the illumination optics unit, the illumination optics unit configured to reflect the invisible light beam along said optical axis, the imaging optics unit configured to receive and direct the invisible light beam into the eye of the user; and
 a sensor configured to receive the invisible light beam reflected back from the eye of the user and to capture an image of the eye.

Optionally, the reflective microdisplay may be a liquid crystal on silicon display or a digital light processing display. Optionally, the image from the microdisplay projected into the eye of a user may be a virtual image. Optionally, the eye tracker module may further include a processor for receiving the image of the eye from the sensor and for monitoring a position of the eye. Optionally, the sensor may provide a real image for monitoring the position of the eye. Optionally, the processor may calculate the position of the eye by using an algorithm. Optionally, the imaging optics unit may be disposed downstream to the illumination optics unit along the optical axis, with the eye tracker module disposed on a first side of the illumination optics unit, and with the visible light source disposed on a second side of the illumination optics unit opposite to the first side. Optionally, the illumination optics unit may include a first beam splitter arranged with an angle of about 45 degrees relative to the optical axis. Optionally, the imaging optics unit may include a second beam splitter and an imaging lens, arranged along the optical axis, the second beam splitter has a first surface for receiving and allowing both the image from the microdisplay and the invisible light beam to pass therethrough, the imaging lens is configured to reflect the image from the microdisplay and the invisible light beam toward a second surface of the second beam splitter, and second surface of the second beam splitter is configured to reflect the image from the microdisplay and the invisible light beam into the eye of the user. Optionally, the imaging optics unit may include a second beam splitter and an imaging lens arranged along the optical axis and a reflector, the second beam splitter has a first surface that allows the image from the microdisplay to pass therethrough and reflects the invisible light beam toward the reflector, wherein the first surface of the second beam splitter is further configured to allow the invisible light beam reflected from the reflector to pass therethrough into the eye of the user, the imaging lens is configured to reflect the image from the microdisplay toward a second surface of the second beam splitter, and the second surface of the second beam splitter is configured to reflect the image from the microdisplay into the eye of the user. Optionally, the invisible light source may be an infrared light-emitting diode light source.

In another embodiment, a head-mounted display apparatus includes:
 a reflective microdisplay;
 a visible light source configured to illuminate the microdisplay;
 a first illumination optics unit configured to direct visible light emanated from the visible light source into the microdisplay, and allow light reflected from the microdisplay in the form of an image to pass therethrough along an optical axis;
 a second illumination optics unit disposed downstream to the first illumination optics unit along said optical axis and allowing the image from the microdisplay to pass therethrough;
 an imaging optics unit configured to project the image from the microdisplay into an eye of a user; and
 an eye tracker module, including:
 an invisible light source configured to emanate an invisible light beam into the second illumination optics unit, the second illumination optics unit configured to reflect the invisible light beam along said optical axis, the imaging optics unit configured to receive and direct the invisible light beam into the eye of the user; and
 a sensor configured to receive the invisible light beam reflected back from the eye of the user and to capture an image of the eye.

Optionally, the reflective microdisplay may be a liquid crystal on silicon display or a digital light processing display. Optionally, the image from the microdisplay projected into the eye of a user may be a virtual image. Optionally, the eye tracker module may further include a processor for receiving the image of the eye from the sensor and for monitoring a position of the eye. Optionally, the sensor may provide a real image for monitoring the position of the eye. Optionally, the processor may calculate the position of the eye by using an algorithm. Optionally, the first illumination optics unit, the second illumination optics unit and the imaging optics unit may be successively arranged along the optical axis, with the eye tracker module and the visible light source disposed on a same side of the second illumination optics unit and the first illumination optics unit, respectively. Optionally, the first illumination optics unit may include a first beam splitter arranged with an angle of about 45 degrees relative to the optical axis and the second illumination optics unit may include a second beam splitter arranged with an angle of about 45 degrees relative to the optical axis, wherein the first beam splitter and the second beam splitter is orthogonal to each other. Optionally, the imaging optics unit may include a third beam splitter and an imaging lens, arranged along the optical axis, the third beam splitter has a first surface for receiving and allowing both the image from the microdisplay and the invisible light beam to pass therethrough, the imaging lens is configured to reflect the image from the microdisplay and the invisible light beam toward a second surface of the third beam splitter, and the second surface of the third beam splitter is configured to reflect the image from the microdisplay and the invisible light beam into the eye of the user. Optionally, the imaging optics unit may include a third beam splitter and an imaging lens arranged along the optical axis and a reflector, the third beam splitter has a first surface that allows the image from the microdisplay to pass therethrough and reflects the invisible light beam toward the reflector, wherein the first surface of the third beam splitter is further configured to allow the invisible light beam reflected from the reflector to pass therethrough into the eye of the user, the imaging lens is configured to reflect the image from the microdisplay toward a second surface of the third beam splitter, and the second surface of the third beam splitter is configured to reflect the image from the microdisplay into the eye of the user. Optionally, the invisible light source may be an infrared light-emitting diode light source.

In yet another embodiment, a head-mounted display apparatus includes:
a transmissive microdisplay;
a visible light source configured to illuminate a back of the microdisplay, such that light in the form of an image is transmitted from a front of the microdisplay along an optical axis;
an illumination optics unit configured to receive and allow the image from the microdisplay to pass therethrough;
an imaging optics unit configured to project the image from the microdisplay into an eye of a user; and
an eye tracker module, including:
an invisible light source configured to emanate an invisible light beam into the illumination optics unit, the illumination optics unit configured to reflect the invisible light beam along said optical axis, the imaging optics unit configured to receive and direct the invisible light beam into the eye of the user; and
a sensor configured to receive the invisible light beam reflected back from the eye of the user and to capture an image of the eye.

Optionally, the illumination optics unit may include a first beam splitter arranged with an angle of about 45 degrees relative to the optical axis. Optionally, the imaging optics unit may include a second beam splitter and an imaging lens arranged along the optical axis, the second beam splitter has a first surface for receiving and allowing both the image from the microdisplay and the invisible light beam to pass therethrough, the imaging lens is configured to reflect the image from the microdisplay and the invisible light beam toward a second surface of the second beam splitter, and the second surface of the second beam splitter is configured to reflect the image from the microdisplay and the invisible light beam into the eye of the user. Optionally, the imaging optics unit may include a second beam splitter and an imaging lens arranged along said optical axis and a reflector, the second beam splitter has a first surface that allows the image from the microdisplay to pass therethrough and reflects the invisible light beam toward the reflector, the first surface of the second beam splitter is further configured to allow the invisible light beam reflected from the reflector to pass therethrough into the eye of the user, wherein the imaging lens is configured to reflect the image from the microdisplay toward a second surface of the second beam splitter, and the second surface of the second beam splitter is configured to reflect the image from the microdisplay into the eye of the user.

Compared to the conventional head-mounted display devices, the head-mounted display apparatuses disclosed herein have the following advantages. 1) They are each provided with an eye tracker module including an invisible light source and a sensor. The invisible light source emanates an invisible light beam which is then received by an imaging optics unit and is directed thereby into an eye of the user. The sensor receives the invisible light beam reflected back from the eye of the user and thus captures an image of the eye, based of which a position of the eye is determinable by calculation. Monitoring the position of the eye allows obtaining a direction and an angle in and at which the eye is staring at an image. This makes it possible to control the displayed image and to track an object. 2) The invisible light beam emanated from the invisible light source enters the illumination optics unit and thereby travels along an optical axis of the invisible light. This results in an improvement in the accuracy of the object tracking. Further, the invisible light beam does not affect the user at all.

The core principle of the head-mounted display apparatuses disclosed herein is to enable the control of a displayed image and tracking of an object by using an eye tracker module including an invisible light source and a sensor, wherein the invisible light source emanates an invisible light beam that is then received by an imaging optics unit and directed thereby into an eye of a user, and the sensor receives the invisible light beam reflected back from the eye of the user and thus captures an image of the eye, and by monitoring the position of the eye to obtain a direction and an angle in and at which the eye is staring.

Embodiment 1

Figure 17:
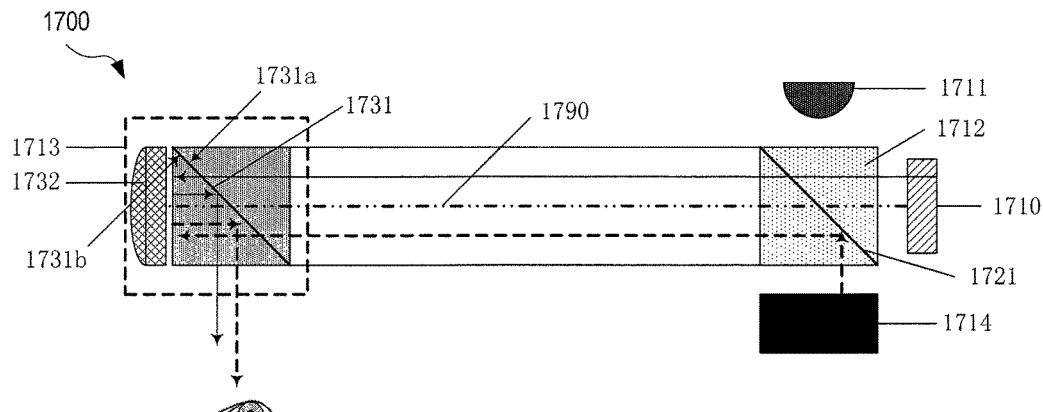
FIG. 17 diagrammatically illustrates a head-mounted display apparatus with coaxial eye imaging and including two beamsplitters, according to an embodiment.

FIG. 17 diagrammatically illustrates one exemplary head-mounted display apparatus 1700 in accordance with an Embodiment 1. Head-mounted display apparatus 1700 is an embodiment of display device 300. As shown in FIG. 17, head-mounted display apparatus 1700 includes: a reflective microdisplay 1710 (an embodiment of display 312), a visible light source 1711 (an embodiment of visible light source 314), an illumination optics unit 1712, an imaging optics unit 1713 (an embodiment of viewing unit 320) and an eye tracker module 1714 (an embodiment of eye imaging unit 220). The visible light source 1711 is configured to illuminate the microdisplay 1710. The illumination optics unit 1712 is configured to direct visible light emanated from the visible light source 1711 into the microdisplay 1710 and to allow light reflected from the microdisplay 1710 carrying an image to pass through the illumination optics unit 1712 and transmit along an optical axis 1790. Illumination optics unit 1712 implements beamsplitter interface 230 and beamsplitter interface 310 as a single beamsplitter 1721. The imaging optics unit 1713 is configured to project the image from the microdisplay 1710 into an eye of a user (as indicated by the arrowed solid lines in FIG. 17). The eye tracker module 1714 includes an invisible light source (an embodiment of IR illumination module 222) and a sensor (an embodiment of camera 224). The invisible light source is adapted to emanate an invisible light beam into the illumination optics unit 1712 which then makes the invisible light beam travel along the optical axis 1790. The imaging optics unit 1713 is configured to receive and direct the invisible light beam into the eye of the user (as indicated by the arrowed dashed lines in FIG. 17). The sensor is configured to receive the invisible light beam reflected back from the eye of the user and to thereby capture an image of the eye. It is noted that the arrowed solid and dashed lines in FIG. 17 are intended solely to indicate directions of different light beams, and, in case of the directions being the same, the lines should coincide but are still presented in the figure as separate lines in order to show that they represent distinct light beams.

The eye tracker module 1714 further includes a processor for receiving the image of the eye from the sensor and for using an algorithm to calculate a position of the eye. This is analogous to an embodiment of display device 300 implementing at least a portion of control module 380 in eye imaging unit 220. The image received by the sensor is a real image for aiding the sensor to monitor the position of the eye. The monitoring of the position of the eye allows knowing a direction and angle of the eye staring at the image from the microdisplay, based on which a portion of the image at which the eye is staring can be determined. This enables the control of the displayed image and the tracking of an object. In addition, without affecting the user at all, the invisible light beam emanated from the invisible light source, after passing through the illumination optics unit 1712, travels coaxially with the visible light along the optical axis 1790, which results in an improvement in the accuracy of the object tracking. Further, the coaxial transmission of the beams establishes a known relationship between the sensor in the eye tracker module 1714 and the microdisplay 1710, thereby making the eye tracker module 1714 free of the need for calibration.

The reflective microdisplay 1710 is a liquid crystal on silicon (LCOS) display or a digital light processing (DLP) display. The image from the microdisplay 1710 is a virtual image. The invisible light source is implemented as an infrared light-emitting diode (LED) light source.

In this embodiment, the imaging optics unit 1713 is disposed downstream to the illumination optics unit 1712 along the optical axis 1790. Additionally, the eye tracker module 1714 is disposed on a first side of the illumination optics unit 1712, and the visible light source 1711 on a second side of the illumination optics unit 1712 that is opposite to the first side. Moreover, the illumination optics unit 1712 includes a first beamsplitter 1721 that is arranged with an angle of about 45 degrees relative to the optical axis 1790. Further, the imaging optics unit 1713 includes a second beamsplitter 1731 (implementing an embodiment of beamsplitter interface 340) and an imaging lens 1732 (an embodiment of imaging objective 342), both arranged along the optical axis 1790. The second beamsplitter 1731 has a first surface 1731a and a second surface 1731b. The first surface 1731a is adapted for reception and passage therethrough of both the image from the microdisplay 1710 and the invisible light beam. The imaging lens 1732 is configured to reflect the image and the invisible light beam toward the second surface 1731b which then reflect the image and the invisible light beam further into the eye of the user.

Without departing from the scope hereof, beamsplitter 1731 may be replaced by other forms of beamsplitter interfaces known in the art, such a polarizing beamsplitter interface or a non-polarizing 50%/50% beamsplitter interface. In embodiments, wherein beamsplitter 1731 is replaced by a polarizing beamsplitter, imaging optics unit 1713 may further include one or more quarterwave plates, for example as discussed above in reference to FIGS. 4-9.

Embodiment 2

Figure 18:
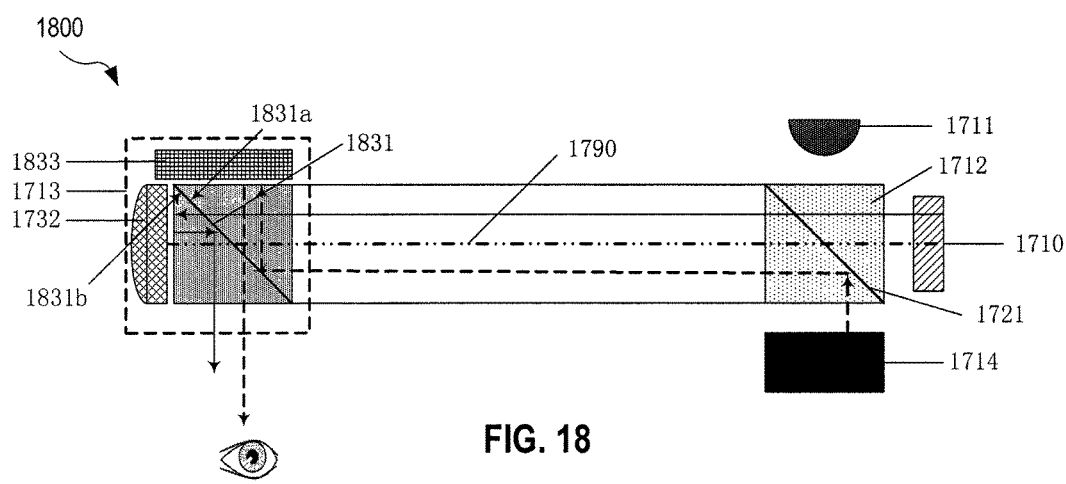
FIG. 18 diagrammatically illustrates a head-mounted display apparatus with coaxial eye imaging and including two beamsplitters and a reflector, according to an embodiment.

FIG. 18 illustrates one exemplary head-mounted display apparatus 1800 in accordance with an Embodiment 2. Head-mounted display apparatus 1800 is an embodiment of display device 300. With combined reference to FIGS. 17 and 18, head-mounted display apparatus 1800 differs from head-mounted display apparatus 1700 in the structure of the imaging optics unit 1713. In head-mounted display apparatus 1800, the imaging optics unit 1713 includes a second beamsplitter 1831 (an embodiment of beamsplitter interface 340), an imaging lens 1732 (and embodiment of imaging objective 342) and a reflector 1833 (an embodiment of IR-band mirror 544). The second beamsplitter 1831 has a first surface 1831a and a second surface 1831b. The first surface 1831a allows the image from the microdisplay 1710 to pass therethrough and reflects the invisible light beam toward the reflector 1833. The first surface 1831a is further configured to allow the invisible light beam reflected from the reflector 1833 to pass therethrough into the eye of the user. The imaging lens 1732 is configured to reflect the image that has passed through the first surface 1831a toward the second surface 1831b which then reflects the image into the eye of the user, as shown in FIG. 18.

Without departing from the scope hereof, beamsplitter 1831 may be replaced by other forms of beamsplitter interfaces known in the art, such a polarizing beamsplitter interface or a non-polarizing 50%/50% beamsplitter interface. In embodiments, wherein beamsplitter 1831 is replaced by a polarizing beamsplitter interface, imaging optics unit 1713 may further include one or more quarterwave plates, for example as discussed above in reference to FIGS. 4-9.

Embodiment 3

Figure 19:
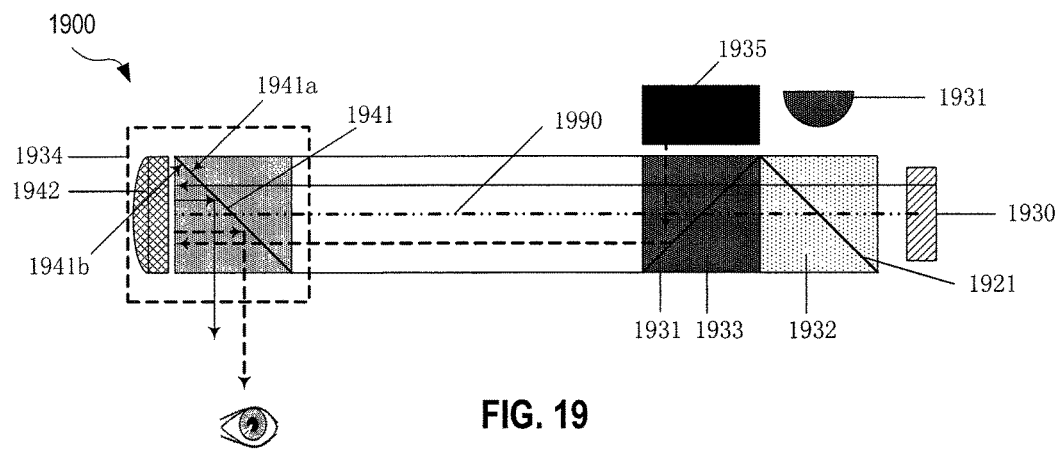
FIG. 19 diagrammatically illustrates a head-mounted display apparatus with coaxial eye imaging and including three beamsplitters, according to an embodiment.

FIG. 19 schematically illustrates one exemplary head-mounted display apparatus 1900 in accordance with an Embodiment 3. Head-mounted display apparatus 1900 is an embodiment of display device 300. As illustrated, head-mounted display apparatus 1900 includes: a reflective microdisplay 1930 (an embodiment of display 312), a visible light source 1931 (an embodiment of visible light source 314), a first illumination optics unit 1932 (implementing an embodiment of beamsplitter interface 310), a second illumination optics unit 1933 (implementing an embodiment of beamsplitter interface 230), an imaging optics unit 1934 (an embodiment of viewing unit 320) and an eye tracker module 1935 (an embodiment of eye imaging unit 220). The visible light source 1931 is configured to illuminate the microdisplay 1930. The first illumination optics unit 1932 is configured to direct visible light emanated from the visible light source 1931 into the microdisplay 1930 and to allow light reflected from the microdisplay 1930 carrying an image to pass through the first illumination optics unit 1932 and transmit along an optical axis 1990. The second illumination optics unit 1933 is disposed downstream to the first illumination optics unit 1932 along the optical axis 1990 and allows the image from the microdisplay 1930 to pass therethrough. The imaging optics unit 1934 is configured to project the image from the microdisplay 1930 into an eye of a user (as indicated by the arrowed solid lines in FIG. 19). The eye tracker module 1935 includes an invisible light source (an embodiment of IR illumination module 222) and a sensor (an embodiment of camera 224). The invisible light source is adapted to emanate an invisible light beam into the second illumination optics unit 1933 which then makes the invisible light beam travel along the optical axis 1990. The imaging optics unit 1934 is configured to receive and direct the invisible light beam into the eye of the user (as indicated by the arrowed dashed lines in FIG. 19). The sensor is configured to receive the invisible light beam reflected back from the eye of the user and to thereby capture an image of the eye. It is noted that the arrowed solid and dashed lines in FIG. 19 are intended solely to indicate directions of different light beams, and, in case of the directions being the same, the lines should coincide but are still presented in the figure as separate lines in order to show that they represent distinct light beams.

The eye tracker module 1935 further includes a processor for receiving the image of the eye from the sensor and for using an algorithm to calculate a position of the eye. This is analogous to an embodiment of display device 300, wherein eye imaging unit 220 implements a portion of control module 380. The image received by the sensor is a real image for aiding the sensor to monitor the position of the eye. The monitoring of the position of the eye allows knowing a direction and angle of the eye staring at the image from the microdisplay, based on which a portion of the image at which the eye is staring can be determined. This enables the control of the displayed image and the tracking of an object. In addition, without affecting the user at all, the invisible light beam emanated from the invisible light source, after passing through the second illumination optics unit 1933, travels coaxially with the visible light along the optical axis 1990, which results in an improvement in the accuracy of the object tracking. Further, the coaxial transmission of the beams establishes a known relationship between the sensor in the eye tracker module 1935 and the microdisplay 1930, thereby making the eye tracker module 1935 free of the need for calibration.

The reflective microdisplay 1930 is an LCoS display or a DLP display. The image from the microdisplay 1930 is a virtual image. The invisible light source is an LED light source.

In this embodiment, the first illumination optics unit 1932, the second illumination optics unit 1933 and the imaging optics unit 1934 are successively arranged along the optical axis 1990. Additionally, the eye tracker module 1935 is disposed on a first side of the second illumination optics unit 1933, and the visible light source 1931 on a first side of the first illumination optics unit 1932. The eye tracker module 1935 and the visible light source 1931 are disposed on a same side of the second illumination optics unit 1933 and the first illumination optics unit 1932, respectively. Moreover, the first illumination optics unit 1932 includes a first beamsplitter 1921 arranged with an angle of about 45 degrees relative to the optical axis 1990. Further, the second illumination optics unit 1933 includes a second beam splitter 1931 that is arranged with an angle of about 45 degrees relative to the optical axis 1990 and is orthogonal to the first beamsplitter 1921. Furthermore, the imaging optics unit 1934 includes a third beamsplitter 1941 (implementing an embodiment of beamsplitter interface 340) and an imaging lens 1942 (an embodiment of imaging objective 342), both arranged along the optical axis 1990. The third beamsplitter 1941 has a first surface 1941a and a second surface 1941b. The first surface 1941a is adapted for reception and passage therethrough of both the image from the microdisplay 1930 and the invisible light beam. The imaging lens 1942 is configured to reflect the image and the invisible light beam toward the second surface 1941b which then reflect the image and the invisible light beam further into the eye of the user.

Without departing from the scope hereof, beamsplitter 1941 may be replaced by other forms of beamsplitter interfaces known in the art, such a polarizing beamsplitter interface or a non-polarizing 50%/50% beamsplitter interface. In embodiments, wherein beamsplitter 1941 is replaced by a polarizing beamsplitter interface, imaging optics unit 1934 may further include one or more quarterwave plates, for example as discussed above in reference to FIGS. 4-9.

Embodiment 4

Figure 20:
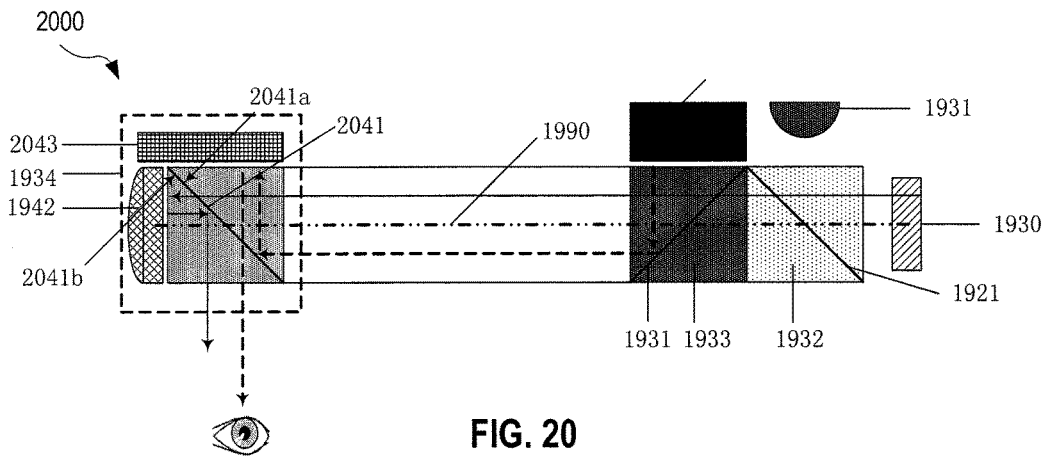
FIG. 20 diagrammatically illustrates a head-mounted display apparatus with coaxial eye imaging and including three beamsplitters and a reflector, according to an embodiment.

FIG. 20 diagrammatically illustrates one exemplary head-mounted display apparatus 2000 in accordance with an Embodiment 4. Head-mounted display apparatus 2000 is an embodiment of display device 300. With combined reference to FIGS. 19 and 20, head-mounted display apparatus 2000 differs from head-mounted display apparatus 1900 in the structure of the imaging optics unit 1934. In this embodiment, the imaging optics unit 1934 includes a third beamsplitter 2041 (implementing an embodiment of beamsplitter interface 340), an imaging lens 1942 and a reflector 2043 (an embodiment of IR-band mirror 544). The third beamsplitter 2041 has a first surface 2041a and a second surface 2041b. The first surface 2041a allows the image from the microdisplay 1930 to pass therethrough and reflects the invisible light beam toward the reflector 1943. The first surface 2041a is further configured to allow the invisible light beam reflected from the reflector 1943 to pass therethrough into the eye of the user. The imaging lens 1942 is configured to reflect the image that has passed through the first surface 2041a toward the second surface 2041b which then reflects the image into the eye of the user, as shown in FIG. 20.

Without departing from the scope hereof, beamsplitter 2041 may be replaced by other forms of beamsplitter interfaces known in the art, such a polarizing beamsplitter interface or a non-polarizing 50%/50% beamsplitter interface. In embodiments, wherein beamsplitter 2041 is replaced by a polarizing beamsplitter interface, imaging optics unit 1934 may further include one or more quarterwave plates, for example as discussed above in reference to FIGS. 4-9.

Embodiment 5

Figure 21:
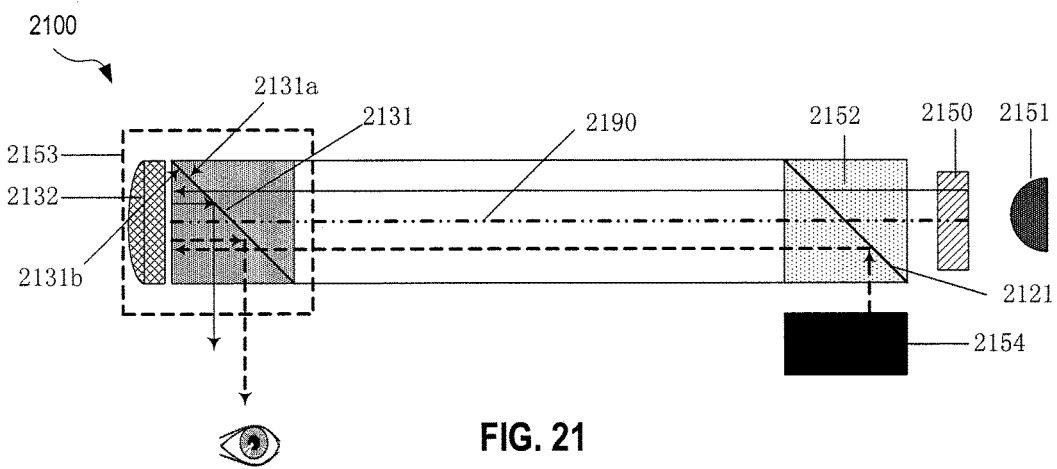
FIG. 21 diagrammatically illustrates a head-mounted display apparatus with coaxial eye imaging and including a backside illuminated display and two beamsplitters, according to an embodiment.

FIG. 21 schematically illustrates a head-mounted display apparatus 2100 in accordance with an Embodiment 5. As illustrated, head-mounted display apparatus 2100 includes:

a transmissive microdisplay 2150 (an embodiment of display 312), a visible light source 2151 (an embodiment of visible light source 314), an illumination optics unit 2152 (implementing an embodiment of beamsplitter interface 230), an imaging optics unit 2153 (an embodiment of viewing unit 320) and an eye tracker module 2154 (an embodiment of eye imaging unit 220). The visible light source 2151 is configured to illuminate a back of the microdisplay 2150, such that light carrying an image is transmitted from a front of the microdisplay 2150 along an optical axis 2190. The illumination optics unit 2152 is configured to receive and allow the image from the microdisplay 2150 to pass through the illumination optics unit 2152. The imaging optics unit 2153 is configured to project the image from the microdisplay 2150 into an eye of a user (as indicated by the arrowed solid lines in FIG. 21). The eye tracker module 2154 includes an invisible light source (an embodiment of IR illumination module 222) and a sensor (an embodiment of camera 224). The invisible light source is adapted to emanate an invisible light beam into the illumination optics unit 2152 which then makes the invisible light beam travel along the optical axis 2190. The imaging optics unit 2153 is configured to receive and direct the invisible light beam into the eye of the user (as indicated by the arrowed dashed lines in FIG. 21). The sensor is configured to receive the invisible light beam reflected back from the eye of the user and to thereby capture an image of the eye. It is noted that the arrowed solid and dashed lines in FIG. 21 are intended merely to indicate directions of different light beams, and, in case of the directions being the same, the lines should coincide but are still presented in the figure as separate lines in order to show that they represent distinct light beams.

In this embodiment, the illumination optics unit 2152 includes a first beam splitter 2121 (implementing an embodiment of beamsplitter interface 230) that is arranged with an angle of about 45 degrees relative to the optical axis 2190. Additionally, the imaging optics unit 2153 includes a second beamsplitter 2131 (implementing an embodiment of beamsplitter interface 340) and an imaging lens 2132 (an embodiment of imaging objective 342), both arranged along the optical axis 2190. The second beamsplitter 2131 has a first surface 2131a for receiving and allowing both the image from the microdisplay 2150 and the invisible light beam to pass therethrough. The imaging lens 2132 is configured to reflect the image and the invisible light beam toward a second surface 2131b of the second beamsplitter 2153. The second surface 2131b is adapted to reflect the image and the invisible light beam into the eye of the user.

Without departing from the scope hereof, beamsplitter 2131 may be replaced by other forms of beamsplitter interfaces known in the art, such a polarizing beamsplitter interface or a non-polarizing 50%/50% beamsplitter interface. In embodiments, wherein beamsplitter 2131 is replaced by a polarizing beamsplitter interface, imaging optics unit 2153 may further include one or more quarterwave plates, for example as discussed above in reference to FIGS. 4-9.

With similarity to the foregoing embodiments, the eye tracker module 2154 further includes a processor for receiving the image of the eye from the sensor and for using an algorithm to calculate a position of the eye. This is analogous to an embodiment of display device 300, wherein a portion of control module 380 is implemented within eye imaging unit 220. The image received by the sensor is a real image for aiding the sensor to monitor the position of the eye. The monitoring of the position of the eye allows knowing a direction and angle of the eye staring at the image from the microdisplay, based on which a portion of the image at which the eye is staring can be determined. This enables the control of the displayed image and the tracking of an object. In addition, without affecting the user at all, the invisible light beam emanated from the invisible light source travels coaxially with the visible light along the optical axis 2190 after it has passed through imaging optics unit 2152, thereby resulting in an improvement in the accuracy of the object tracking. Further, the coaxial transmission of the beams establishes a known relationship between the sensor in the eye tracker module 2153 and the microdisplay 2150, thus making the eye tracker module 2153 free of the need for calibration.

Furthermore, the transmissive microdisplay 2150 is an LCoS display or a DLP display. The image from the microdisplay 2150 is a virtual image. The invisible light source is an LED light source.

Embodiment 6

Figure 22:
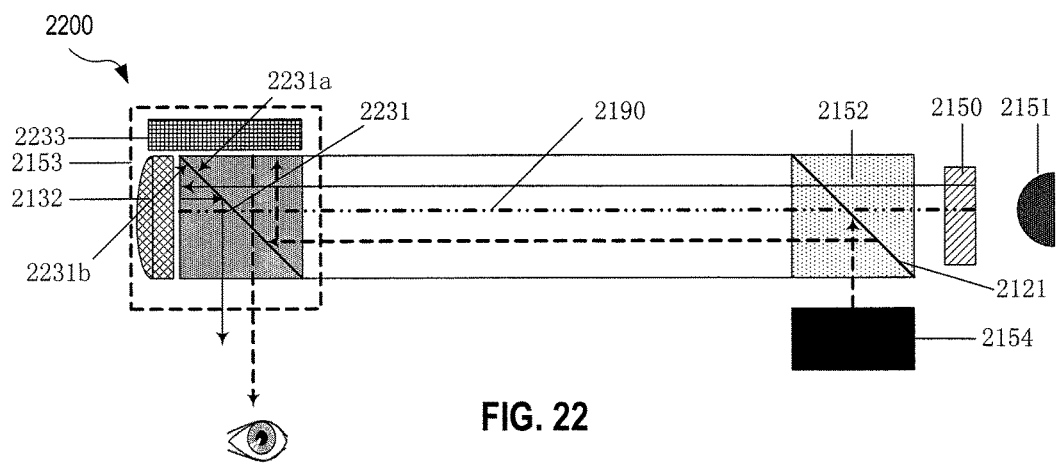
FIG. 22 diagrammatically illustrates a head-mounted display apparatus with coaxial eye imaging and including a backside illuminated display, two beamsplitters, and a reflector, according to an embodiment.

FIG. 22 illustrates one exemplary head-mounted display apparatus 2200 in accordance with an Embodiment 6. With combined reference to FIGS. 21 and 22, head-mounted display apparatus 2200 differs from head-mounted display apparatus 2100 in the structure of the imaging optics unit 2153. In head-mounted display apparatus 2200, the imaging optics unit 2153 includes a second beamsplitter 2231 (implementing an embodiment of beamsplitter interface 340), an imaging lens 2132 and a reflector 2233 (an embodiment of IR-band mirror 544). The second beamsplitter 2231 has a first surface 2231a which allows the image from the microdisplay 2250 to pass therethrough and reflects the invisible light beam toward the reflector 2233. The first surface 2231a is further configured to allow the invisible light beam reflected from the reflector 2233 to pass therethrough into the eye of the user. The imaging lens 2132 is configured to reflect the image that has passed through the first surface 2231a toward the second surface 2241b of the second beamsplitter 2231, which then reflects the image into the eye of the user, as shown in FIG. 22.

Without departing from the scope hereof, beamsplitter 2231 may be replaced by other forms of beamsplitter interfaces known in the art, such a polarizing beamsplitter interface or a non-polarizing 50%/50% beamsplitter interface. In embodiments, wherein beamsplitter 2231 is replaced by a polarizing beamsplitter interface, imaging optics unit 2253 may further include one or more quarterwave plates, for example as discussed above in reference to FIGS. 4-9.

As can be understood from the foregoing description, the head-mounted display apparatuses, constructed in the section "Additional Embodiments", are each provided with an eye tracker module including an invisible light source and a sensor. The invisible light source emanates an invisible light beam which is then received by an imaging optics unit and is directed thereby into an eye of the user. The sensor receives the invisible light beam reflected back from the eye of the user and thus captures an image of the eye, based of which a position of the eye is determinable by calculation. Monitoring the position of the eye allows obtaining a direction and an angle of the eye staring at an image. This makes it possible to control the displayed image and to track an object. In addition, the invisible light beam emanated from the invisible light source enters the illumination optics unit and thereby travels along an optical axis of the invisible light. This results in an improvement in the accuracy of the object tracking. Further, the invisible light beam does not have any impact on the user.

Combinations of Features

Features described above as well as those claimed below may be combined in various ways without departing from the scope hereof. For example, it will be appreciated that aspects of one near-eye display system, device, or method with described herein may incorporate or swap features of another near-eye display system, device, or method described herein. The following examples illustrate possible, non-limiting combinations of embodiments described above. It should be clear that many other changes and modifications may be made to the methods and device herein without departing from the spirit and scope of this invention:

(A1) A near-eye display device, with coaxial eye imaging, for mounting in field of view of an eye of a user may include a display unit for displaying a display image, a viewing unit for (i) presenting the display image to the eye based upon polarized visible light received from the display unit and (ii) transmitting ambient light from an ambient scene toward the eye, and an eye imaging unit with (a) an illumination module for generating infrared light, (b) a first polarizing beamsplitter interface, disposed between the display unit and the viewing unit, for (i) merging a polarized infrared component of the infrared light with the polarized visible light and (ii) separating from the polarized visible light a portion of the polarized infrared component reflected by the eye, and (c) a camera for forming an image of the eye based upon the portion of the polarized infrared component reflected by the eye.

(A2) In the near-eye display device denoted as (A1), the first polarizing beamsplitter interface may be configured to transmit the polarized visible light and reflect the polarized infrared component.

(A3) In either or both of the near-eye display devices denoted as (A1) and (A2), the display unit may be configured to emit the polarized visible light as p-polarized visible light.

(A4) In any of the near-eye display devices denoted as (A1) through (A3), the first polarizing beamsplitter interface may be configured to produce, by reflection, the polarized infrared component as s-polarized infrared light.

(A5) In any of the near-eye display devices denoted as (A1) through (A4), the viewing unit may include a second polarizing beam splitter interface configured for (i) transmitting the polarized visible light received from the display unit and (ii) reflecting the polarized infrared component received from the first polarizing beamsplitter interface.

(A6) In the near-eye display device denoted as (A5), the second polarizing beam splitter interface may be configured to reflect toward the ambient scene the polarized infrared component received from the first polarizing beamsplitter interface.

(A7) In the near-eye display device denoted as (A6), the viewing unit may further include (a) an infrared-band mirror disposed between the second polarizing beamsplitter interface and the ambient scene for retro-reflecting the polarized infrared component reflected toward the ambient scene by the second polarizing beamsplitter interface, and (b) an infrared-band quarter-wave plate for rotating polarization of the polarized infrared component to form, in cooperation with the infrared-band mirror, orthogonally polarized infrared light to be transmitted by the second polarizing beamsplitter interface toward the eye.

(A8) In any of the near-eye display devices denoted as (A5) through (A7), the viewing unit may include an imaging objective for focusing the polarized visible light to present the display image to the eye.

(A9) In the near-eye display device denoted as (A8), the imaging objective may be a reflective imaging objective.

(A10) In the near-eye display device denoted as (A9), the viewing unit may further include a visible-band quarter-wave plate disposed between the second polarizing beamsplitter interface and the imaging objective for rotating polarization of the polarized visible light to form, in cooperation with the imaging objective, orthogonally polarized visible light to be reflected by the second polarizing beamsplitter interface toward the eye.

(A11) Any of the near-eye display devices denoted as (A5) through (A10) may include (a) a first beamsplitter cube implementing the first polarizing beamsplitter interface and having a first face facing the viewing unit, (b) a second beamsplitter cube implementing the second polarizing beamsplitter interface and having a second face facing the first face, and (c) a solid light tunnel having (i) a first planar surface bonded to the first face and (ii) a second planar surface bonded to the second face.

(A12) In the near-eye display device denoted as (A11), the illumination module and the camera may be implemented in a package that is directly mounted to at least one of the first beamsplitter cube and the solid light tunnel.

(A13) In either or both of the near-eye display devices denoted as (A11) and (A12), the display unit may include a display and a third beamsplitter cube having (a) a third polarizing beamsplitter interface for transmitting the polarized visible light from the display toward the viewing unit and (b) a third face bonded to a fourth face of the first beamsplitter cube, the fourth face opposite the first face.

(A14) In any of the near-eye display devices denoted as (A1) through (A13), the display unit may include (a) a liquid-crystal-on-silicon display for displaying the display by generating the polarized visible light from polarized visible illumination light, (b) an illumination module for generating visible illumination light including the polarized illumination light, and (c) a third polarizing beam splitter interface for (i) reflecting, from the visible illumination light, only the polarized visible illumination light toward the liquid-crystal-on-silicon display and (ii) transmitting the polarized visible light from the liquid-crystal-on-silicon display.

(A15) In any of the near-eye display devices denoted as (A1) through (A14), the imaging unit further may include a control module, communicatively coupled with the illumination module, for activating the illumination module for a finite duration to illuminate the eye with at least a portion of the infrared light during the finite duration.

(A16) In the near-eye display device denoted as (A15), the control module may further be communicatively coupled with the camera and configured to induce capture of the image of the eye during the finite duration.

(B1) A method for performing coaxial eye imaging in a near-eye display device for mounting in field of view of an eye of a user may include (a) using a first polarizing beamsplitter interface to merge polarized infrared light with polarized visible display light from a display, (b) using a second polarizing beamsplitter interface to superimpose the polarized infrared light and the polarized visible light on ambient light from an ambient scene to (i) illuminate the eye with the polarized infrared light, (ii) present an image of the display to the eye, and (iii) allow the eye to view the ambient scene, and (c) imaging the eye through the second polarizing beamsplitter interface and the first polarizing beamsplitter interface based upon a portion of the polarized infrared light reflected by the eye.

(B2) In the method denoted as (B1), the step of imaging may include separating the portion of the polarized infrared light reflected by the eye from the ambient light using the second polarizing beamsplitter interface, and separating the portion of the polarized infrared light reflected by the eye from the polarized visible light using the first polarizing beamsplitter interface.

(B3) In either or both of the methods denoted as (B1) and (B2), the step of using a second polarizing beamsplitter interface may include (a) using the second polarizing beamsplitter interface to reflect toward the ambient scene the polarized infrared light received from the first polarizing beamsplitter interface, (b) retro-reflecting and rotating polarization of the polarized infrared light to produce orthogonally polarized infrared light, and (c) transmitting the orthogonally polarized infrared light through the second polarizing beamsplitter interface toward the eye to illuminate the eye.

(B4) In the method denoted as (B3), the step of retro-reflecting and rotating polarization may include (a) passing the polarized infrared light, reflected toward the scene by the second polarizing beamsplitter interface, through an infrared-band quarter-wave plate to rotate polarization of the polarized infrared light, (b) retro-reflecting on an infrared-band mirror the polarized infrared light passed through the infrared-band quarter-wave plate, and (c) passing the polarized infrared light, retro-reflected by the infrared-band mirror, through the infrared-band quarter-wave plate to further rotate the polarized infrared light so as to produce the orthogonally polarized infrared light.

(B5) Any of the methods denoted as (B1) through (B4) may further include (a) transmitting through the second polarizing beamsplitter interface the polarized visible light received from the first polarizing beamsplitter interface, (b) retro-reflecting and rotating polarization of the polarized visible light transmitted by the second polarizing beamsplitter interface to produce orthogonally polarized visible light, and (c) using the second polarizing beamsplitter interface to reflect the orthogonally polarized visible light toward the eye to present the image of the display to the eye.

(B6) In the method denoted as (B5), the step of retro-reflecting and rotating polarization may include retro-reflecting the polarized visible light on a curved mirror surface to present to the eye the image of the display as a virtual image located at a distance from the eye greater than light propagation distance from the display to the eye.

(B7) Any of the methods denoted as (B1) through (B6) may further include (a) generating infrared light using an illumination module mechanically coupled with at least one of (i) a first beamsplitter cube implementing the first polarizing beamsplitter interface and (ii) a light tunnel connecting the first beamsplitter cube with a second beamsplitter cube implementing the second polarizing beamsplitter interface, and (c) reflecting only one polarization component of the infrared light on the first polarizing beamsplitter interface to produce the polarized infrared light.

(B8) In the method denoted as (B7), the step of imaging may include imaging the eye using a camera mechanically coupled with at least one of the first beamsplitter cube and the light tunnel.

(B9) Any of the methods denoted as (B1) through (B8) may further include (a) generating visible illumination light, (b) using a third polarizing beamsplitter interface to reflect only a first polarization component of the visible illumination light toward the display to illuminate the display with polarized visible illumination light, (c) based upon the visible illumination light and settings of the display, emitting first visible display light from the display toward the third polarizing beamsplitter interface, and (d) transmitting only a second polarization component, orthogonal to the first polarization component, of the first visible light through the third polarizing beamsplitter interface and the first polarizing beamsplitter interface toward the second polarizing beamsplitter interface.

Changes may be made in the above devices and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and device, which, as a matter of language, might be said to fall therebetween.

What is claimed is:

1. A near-eye display device, with coaxial eye imaging, for mounting in field of view of an eye of a user, comprising:
    a display unit for displaying a display image;
    a viewing unit for (i) presenting the display image to the eye based upon polarized visible light received from the display unit and (ii) transmitting ambient light from an ambient scene toward the eye; and
    an eye imaging unit including
        an illumination module for generating infrared light,
        a first polarizing beamsplitter interface, disposed between the display unit and the viewing unit, for (i) merging a polarized infrared component of the infrared light with the polarized visible light and (ii) separating from the polarized visible light a portion of the polarized infrared component reflected by the eye, and
        a camera for forming an image of the eye based upon the portion;
    wherein the viewing unit includes:
        an imaging objective for focusing the polarized visible light to present the display image to the eye,
        a second polarizing beam splitter interface configured for (i) transmitting the polarized visible light received from the display unit and (ii) reflecting toward the ambient scene the polarized infrared component received from the first polarizing beamsplitter interface,
        an infrared-band mirror disposed between the second polarizing beamsplitter interface and the ambient scene for retro-reflecting the polarized infrared component reflected toward the ambient scene by the second polarizing beamsplitter interface, and
        an infrared-band quarter-wave plate for rotating polarization of the polarized infrared component to form, in cooperation with the infrared-band mirror, orthogonally polarized infrared light to be transmitted by the second polarizing beamsplitter interface toward the eye.

2. The near-eye display device of claim 1, the first polarizing beamsplitter interface being configured to transmit the polarized visible light and reflect the polarized infrared component.

3. The near-eye display device of claim 2, the display unit being configured to emit the polarized visible light as p-polarized visible light, the first polarizing beamsplitter interface being configured to produce, by reflection, the polarized infrared component as s-polarized infrared light.

4. The near-eye display device of claim 1,
    the imaging objective being a reflective imaging objective; and
    the viewing unit further including
        a visible-band quarter-wave plate disposed between the second polarizing beamsplitter interface and the imaging objective for rotating polarization of the polarized visible light to form, in cooperation with the imaging objective, orthogonally polarized visible light to be reflected by the second polarizing beamsplitter interface toward the eye.

5. The near-eye display device of claim 1, comprising:
    a first beamsplitter cube implementing the first polarizing beamsplitter interface and having a first face facing the viewing unit;
    a second beamsplitter cube implementing the second polarizing beamsplitter interface and having a second face facing the first face; and
    a solid light tunnel having (i) a first planar surface bonded to the first face and (ii) a second planar surface bonded to the second face.

6. The near-eye display device of claim 5, the illumination module and the camera being implemented in a package that is directly mounted to at least one of the first beamsplitter cube and the solid light tunnel.

7. The near-eye display device of claim 5, the display unit comprising:
    a display; and
    a third beamsplitter cube having a third polarizing beamsplitter interface for transmitting the polarized visible light from the display toward the viewing unit, and a third face bonded to a fourth face of the first beamsplitter cube, the fourth face opposite the first face.

8. The near-eye display device of claim 1, the display unit comprising:

a liquid-crystal-on-silicon display for displaying the display by generating the polarized visible light from polarized visible illumination light;

an illumination module for generating visible illumination light including the polarized illumination light; and a third polarizing beam splitter interface for (i) reflecting, from the visible illumination light, only the polarized visible illumination light toward the liquid-crystal-on-silicon display and (ii) transmitting the polarized visible light from the liquid-crystal-on-silicon display.

9. The near-eye display device of claim 1, the imaging unit further comprising a control module, communicatively coupled with the illumination module, for activating the illumination module for a finite duration to illuminate the eye with at least a portion of the infrared light during the finite duration.

10. The near-eye display device of claim 9, the control module further being communicatively coupled with the camera and configured to induce capture of the image of the eye during the finite duration.

11. A method for performing coaxial eye imaging in a near-eye display device for mounting in field of view of an eye of a user, comprising:

using a first polarizing beamsplitter interface to merge polarized infrared light with polarized visible display light from a display;

using a second polarizing beamsplitter interface to superimpose the polarized infrared light and the polarized visible light on ambient light from an ambient scene to (a) illuminate the eye with the polarized infrared light, (b) present an image of the display to the eye, and (c) allow the eye to view the ambient scene, said using a second polarizing beamsplitter interface including:

using the second polarizing beamsplitter interface to reflect toward the ambient scene the polarized infrared light received from the first polarizing beamsplitter interface, retro-reflecting and rotating polarization of the polarized infrared light to produce orthogonally polarized infrared light, and transmitting the orthogonally polarized infrared light through the second polarizing beamsplitter interface toward the eye to illuminate the eye; and imaging the eye through the second polarizing beamsplitter interface and the first polarizing beamsplitter interface based upon a portion of the polarized infrared light reflected by the eye.

12. The method of claim 11, the step of imaging comprising:

separating the portion of the polarized infrared light reflected by the eye from the ambient light using the second polarizing beamsplitter interface; and separating the portion of the polarized infrared light reflected by the eye from the polarized visible light using the first polarizing beamsplitter interface.

13. The method of claim 11, the step of retro-reflecting and rotating polarization comprising:

passing the polarized infrared light, reflected toward the scene by the second polarizing beamsplitter interface, through an infrared-band quarter-wave plate to rotate polarization of the polarized infrared light;

retro-reflecting on an infrared-band mirror the polarized infrared light passed through the infrared-band quarter-wave plate; and passing the polarized infrared light, retro-reflected by the infrared-band mirror, through the infrared-band quarter-wave plate to further rotate the polarized infrared light so as to produce the orthogonally polarized infrared light.

14. The method of claim 11, further comprising:

transmitting through the second polarizing beamsplitter interface the polarized visible light received from the first polarizing beamsplitter interface;

retro-reflecting and rotating polarization of the polarized visible light transmitted by the second polarizing beamsplitter interface to produce orthogonally polarized visible light; and using the second polarizing beamsplitter interface to reflect the orthogonally polarized visible light toward the eye to present the image of the display to the eye.

15. The method of claim 14, the step of retro-reflecting and rotating polarization comprising retro-reflecting the polarized visible light on a curved mirror surface to present to the eye the image of the display as a virtual image located at a distance from the eye greater than light propagation distance from the display to the eye.

16. The method of claim 11, further comprising:

generating infrared light using an illumination module mechanically coupled with at least one of (a) a first beamsplitter cube implementing the first polarizing beamsplitter interface and (b) a light tunnel connecting the first beamsplitter cube with a second beamsplitter cube implementing the second polarizing beamsplitter interface; and reflecting only one polarization component of the infrared light on the first polarizing beamsplitter interface to produce the polarized infrared light.

17. The method of claim 16, the step of imaging comprising imaging the eye using a camera mechanically coupled with at least one of the first beamsplitter cube and the light tunnel.

18. The method of claim 16, further comprising:

generating visible illumination light;

using a third polarizing beamsplitter interface to reflect only a first polarization component of the visible illumination light toward the display to illuminate the display with polarized visible illumination light;

based upon the visible illumination light and settings of the display, emitting first visible display light from the display toward the third polarizing beamsplitter interface; and transmitting only a second polarization component, orthogonal to the first polarization component, of the first visible light through the third polarizing beamsplitter interface and the first polarizing beamsplitter interface toward the second polarizing beamsplitter interface.

* * * * *